(12) United States Patent
Yonezawa et al.

(10) Patent No.: US 8,571,720 B2
(45) Date of Patent: Oct. 29, 2013

(54) SUPPLY-DEMAND BALANCE CONTROLLER

(75) Inventors: Minoru Yonezawa, Tokyo (JP);
Tomoshi Otsuki, Kawasaki (JP);
Yoshiyuki Sakamaki, Kawasaki (JP);
Nobutaka Nishimura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 263 days.

(21) Appl. No.: 13/071,030

(22) Filed: Mar. 24, 2011

(65) Prior Publication Data

US 2012/0065792 A1 Mar. 15, 2012

(30) Foreign Application Priority Data

Sep. 9, 2010 (JP) ................................. 2010-201987

(51) Int. Cl.
*G05D 3/12* (2006.01)
(52) U.S. Cl.
USPC .......................................... 700/291; 700/295
(58) Field of Classification Search
USPC ........................................................ 700/291
See application file for complete search history.

(56) References Cited

U.S. PATENT DOCUMENTS

| | | | |
|---|---|---|---|
| 5,479,358 A * | 12/1995 | Shimoda et al. ............... 700/291 |
| 7,085,660 B2 * | 8/2006 | Mansingh et al. ............... 702/60 |
| 7,430,545 B2 * | 9/2008 | Kanbara et al. ................ 705/412 |
| 7,698,233 B1 * | 4/2010 | Edwards et al. ............... 705/412 |
| 7,813,814 B2 * | 10/2010 | Dittes ................................. 700/2 |
| 8,260,468 B2 * | 9/2012 | Ippolito et al. ................ 700/286 |
| 2003/0055677 A1 * | 3/2003 | Brown et al. ....................... 705/1 |
| 2003/0144864 A1 * | 7/2003 | Mazzarella ........................ 705/1 |
| 2003/0189420 A1 * | 10/2003 | Hashimoto et al. ............ 323/212 |
| 2004/0254899 A1 * | 12/2004 | Abe et al. ........................ 705/412 |
| 2005/0004858 A1 * | 1/2005 | Foster et al. ..................... 705/36 |
| 2005/0033481 A1 * | 2/2005 | Budhraja et al. .............. 700/286 |
| 2005/0096797 A1 * | 5/2005 | Matsubara et al. ........... 700/291 |

(Continued)

FOREIGN PATENT DOCUMENTS

| | | |
|---|---|---|
| JP | 2000-333369 | 11/2000 |
| JP | 2008-271723 | 11/2008 |

OTHER PUBLICATIONS

Carpaneto, Enrico; Chicco, G., "Probability distributions of the aggregated residential load," Probabilistic Methods Applied to Power Systems, 2006. PMAPS 2006. International Conference on , vol., No., pp. 1,6, Jun. 11-15, 2006.*

(Continued)

*Primary Examiner* — Ryan A. Jarrett
*Assistant Examiner* — Michael Scapin
(74) *Attorney, Agent, or Firm* — Oblon, Spivak, McClelland, Maier & Neustadt, L.L.P.

(57) ABSTRACT

A first predicting unit predicts a power demand required by each customer. A first reliability value calculator calculates the reliability value of the predictive power demand for each customer. Predicted power supply from a power system is calculated with respect to each power generating unit. A second reliability value calculator calculates the reliability value of the predictive power supply for each power generating unit. A balancing unit obtains a supply-demand margin level based on the difference between: a first weighted sum obtained by performing weighted sum on the predictive power demand and a weight depending on the reliability value; and a second weighted sum obtained by performing weighted sum on the predictive power supply and a weight depending on the reliability value. A plan creator creates a plan for controlling power used by the controllable appliance of the customer based on the supply-demand margin level.

11 Claims, 26 Drawing Sheets

(56) References Cited

U.S. PATENT DOCUMENTS

| | | | |
|---|---|---|---|
| 2005/0102068 A1* | 5/2005 | Pimputkar et al. | 700/291 |
| 2007/0005192 A1* | 1/2007 | Schoettle et al. | 700/286 |
| 2009/0069950 A1* | 3/2009 | Kurokami et al. | 700/291 |
| 2010/0145534 A1* | 6/2010 | Forbes et al. | 700/291 |
| 2010/0179704 A1* | 7/2010 | Ozog | 700/291 |
| 2010/0179862 A1* | 7/2010 | Chassin et al. | 705/10 |
| 2010/0191996 A1* | 7/2010 | Iino et al. | 713/323 |
| 2010/0292856 A1* | 11/2010 | Fujita | 700/291 |
| 2011/0082596 A1* | 4/2011 | Meagher et al. | 700/291 |
| 2011/0153103 A1* | 6/2011 | Brown et al. | 700/291 |
| 2011/0307109 A1* | 12/2011 | Sri-Jayantha | 700/291 |
| 2012/0010758 A1* | 1/2012 | Francino et al. | 700/291 |

OTHER PUBLICATIONS

Ipakchi et al. "Grid of the Future Are We Ready to Transition to a Smart Grid" IEEE Power & Energy Magazine Mar. 2009 pp. 52-62.*

Xiangjun Li et al. "Study on Power Quality Control in Multiple Renewable Energy Hybrid MicroGrid System" Power Tech, 2007 IEEE Lausanne.*

U.S. Appl. No. 13/535,816, filed Jun. 28, 2012, Yonezawa.

* cited by examiner

DEMAND DATA EXAMPLE OF CUSTOMER N (POWER CONSUMPTION)

| APPLIANCE | POWER CONSUMPTION | TIME | DATE | TYPE |
|---|---|---|---|---|
| AIR CONDITIONER A | 0.5kW | 10:30 | 2010/8/4 | VARIATION (RELIABILITY II) |
| AIR CONDITIONER B | 0.4kW | 10:30 | 2010/8/4 | VARIATION (RELIABILITY III) |
| AIR CONDITIONER C | 0.1kW | 10:30 | 2010/8/4 | VARIATION (RELIABILITY II) |
| WASHING MACHINE | 0.4kW | 10:30 | 2010/8/4 | VARIATION (RELIABILITY III) |
| LIGHTING (ROOM A) | 0.08kW | 10:30 | 2010/8/4 | HIGH ACCURACY (RELIABILITY I) |
| DEVICE A | 0.02kW | 10:30 | 2010/8/4 | HIGH ACCURACY (RELIABILITY I) |

FIG. 4

DEMAND DATA EXAMPLE OF CUSTOMER N (POWER CONSUMPTION)

| APPLIANCE | POWER CONSUMPTION AMOUNT | MEASUREMENT START TIME | MEASUREMENT ENDING TIME | DATE | TYPE |
|---|---|---|---|---|---|
| AIR CONDITIONER A | 0.5kWh | 10:00 | 10:30 | 2010/8/4 | VARIATION (RELIABILITY II) |
| AIR CONDITIONER B | 0.4kWh | 10:00 | 10:30 | 2010/8/4 | VARIATION (RELIABILITY III) |
| AIR CONDITIONER C | 0.1kWh | 10:00 | 10:30 | 2010/8/4 | VARIATION (RELIABILITY II) |
| WASHING MACHINE | 0.1kWh | 10:00 | 10:30 | 2010/8/4 | VARIATION (RELIABILITY III) |
| LIGHTING (ROOM A) | 0.08kWh | 10:00 | 10:30 | 2010/8/4 | HIGH ACCURACY (RELIABILITY I) |
| DEVICE A | 0.02kWh | 10:00 | 10:30 | 2010/8/4 | HIGH ACCURACY (RELIABILITY I) |

FIG. 5

DMAND DATA EXAMPLE OF CUSTOMER N

| APPLIANCE | POWER CONSUMPTION | TIME | DATE | TYPE |
|---|---|---|---|---|
| AIR CONDITIONER | 1.0kW | 10:30 | 2010/8/4 | VARIATION (RELIABILITY II) |
| WASHING MACHINE | 0.4kW | 10:30 | 2010/8/4 | VARIATION (RELIABILITY III) |
| LIGHTING | 0.08kW | 10:30 | 2010/8/4 | HIGH ACCURACY (RELIABILITY I) |
| DEVICE A | 0.02kW | 10:30 | 2010/8/4 | HIGH ACCURACY (RELIABILITY I) |

FIG. 6

DEMAND DATA EXAMPLE OF CUSTOMER N (POWER CONSUMPTION AMOUNT)

| APPLIANCE | POWER CONSUPTION AMOUNT | MEASUREMENT START TIME | MEASUREMENT ENDING TIME | DATE | TYPE |
|---|---|---|---|---|---|
| AIR CONDITIONER | 1.0kWh | 10:00 | 10:30 | 2010/8/4 | VARIATION (RELIABILITY II) |
| WASHING MACHINE | 0.1kWh | 10:00 | 10:30 | 2010/8/4 | VARIATION (RELIABILITY III) |
| LIGHTING | 0.2kWh | 10:00 | 10:30 | 2010/8/4 | HIGH ACCURACY (RELIABILITY I) |
| DEVICE A | 0.02kWh | 10:00 | 10:30 | 2010/8/4 | HIGH ACCURACY (RELIABILITY I) |

FIG. 7

DEMAND DATA EXAMPLE OF CUSTOMERS

| CUSTOMER | POWER CONSUMPTION | TIME | DATE | TYPE |
|---|---|---|---|---|
| CUTOMER N | 6.0kW | 10:30 | 2010/8/4 | VARIATION (RELIABILITY II) |
| CUSTOMER N + 1 | 3.0kW | 10:30 | 2010/8/4 | VARIATION (RELIABILITY III) |
| CUSTOMER N + 2 | 1.5kW | 10:30 | 2010/8/4 | HIGH ACCURACY (RELIABILITY I) |
| CUSTOMER N + 3 | 2.2kW | 10:30 | 2010/8/4 | HIGH ACCURACY (RELIABILITY I) |

FIG. 8

DEMAND DATA EXAMPLE OF CUSTOMERS (POWER CONSUMPTION AMOUNT)

| APPLIANCE | POWER CONSUMPTION AMOUNT | MEASUREMENT START TIME | MEASUREMENT ENDING TIME | DATE | TYPE |
|---|---|---|---|---|---|
| CUSTOMER N | 6.0kWh | 10:00 | 10:30 | 2010/8/4 | VARIATION (RELIABILITY II) |
| CUSTOMER N + 1 | 3.0kWh | 10:00 | 10:30 | 2010/8/4 | VARIATION (RELIABILITY III) |
| CUSTOMER N + 2 | 1.5kWh | 10:00 | 10:30 | 2010/8/4 | HIGH ACCURACY (RELIABILITY I) |
| CUSTOMER N + 3 | 2.2kWh | 10:00 | 10:30 | 2010/8/4 | HIGH ACCURACY (RELIABILITY I) |

FIG. 9

DATA EXAMPLE OF CONTROLLABLE DEMAND INFORMATION OF CUSTOMER N

| APPLIANCE | MAXIMUM POWER CONSUMPTION AMOUNT | MINIMUM POWER CONSUMPTION AMOUNT | SET START TIME | SET FINISH TIME | DATE | TYPE |
|---|---|---|---|---|---|---|
| EV CHARGE | 6.0kWh | - | 18:00 | NEXT DAY 4:00 | 2010/8/4 | ARBITRRY TIME WITHIN SPECIFIC PERIOD |
| LIGHTING | 3.0kWh | 0kWh | 10:00 | 18:30 | 2010/8/4 | ON/OFF IS ARBITRARY |
| AIR CONDITIONER A | 1.5kWh | 0.8kWh | 9:00 | 18:30 | 2010/8/4 | SETTING CHANGE OK |
| CELL | DEPENDING ON SOC | 0kWh | ALL DAY | ALL DAY | 2010/8/4 | |

FIG. 10

DATA EXAMPLE OF CONTROLLABLE DEMAND INFORMATION OF CUSTOMER N

| APPLIANCE | SET START TIME | SET FINISH TIME | DATE | TYPE |
|---|---|---|---|---|
| EV CHARGE | 18:00 | NEXT DAY 4:00 | 2010/8/4 | ARBITRARY TIME WITHIN SPECIFIC PERIOD |
| LIGHTING | 10:00 | 18:30 | 2010/8/4 | ON/OFF IS ARBITRARY |
| AIR CONDITIONER A | 9:00 | 18:30 | 2010/8/4 | SETTING CHANGE OK |
| CELL | ALL DAY | ALL DAY | 2010/8/4 | |

FIG. 11

DATA EXAMPLE OF CONTRLLABLE DEMAND INFORMATION OF CUSTOMER N

| APPLIANCE | SET START TIME | SET FINISH TIME | DATE | TYPE |
|---|---|---|---|---|
| EV CHARGE | 18:00 | NEXT DAY 4:00 | 2010/8/4 | CHARGE IS PERFORMED FOR ARBITRARY TIME WITHIN SPECIFIC PREOD IN ACCORDANCE WITH SPECIFIC PROFILE AS IN THE FOLLOWING (CAN BE STOPPED IN THE MIDDLE OF OPERATION) |

DATA EXAMPLE OF CONTROLLABLE DEMAND INFORMATION OF CUSTOMER N

| APPLIANCE | SET START TIME | SET FINISH TIME | DATE | TYPE |
|---|---|---|---|---|
| EV CHARGE | 18:00 | NEXT DAY 4:00 | 2010/8/4 | CELL IS CHARGED UP TO 80% FOR ARBITRARY TIME WITHIN SPECIFIC PERIOD (MAY BE DISCHARGED) |

FIG. 13

DATA EXAMPLE OF CONTROLLABLE DEMAND INFORMATION OF CUSTOMER N

| APPLIANCE | SET START TIME | SET FINISH TIME | DATE | TYPE |
|---|---|---|---|---|
| CUSTOMER A | 18:00 | NEXT DAY 4:00 | 2010/8/4 | ZERO SUPPLY IS OK FOR ARBITRARY THREE MINUTES (RELIABILITY II) |
| CUSTOMER B | 10:00 | 18:30 | 2010/8/4 | REDUCIBLE BY TOTALLY 30 kWh (RELIABILITY I) |
| CUSTOMER C | 9:00 | 18:30 | 2010/8/4 | REDUCIBLE BY TOTALLY 20 kWh (RELIABILITY I) |
| CUSTOMER D | ALL DAY | ALL DAY | 2010/8/4 | REDUCIBLE BY 10% (RELIABILITY III) |

FIG. 14

CONTROLLABLE DEMAND GENERATING/STOPPING JUDGMENT TABLE

| | Ms<−X1 | −X1≦Ms<X2 | Ms≧X2 |
|---|---|---|---|
| MI<−Y1 | SSLS | LS | LS |
| −Y1≦MI<Y2 | SS | LMSM | SL |
| MI≧Y2 | SS | LL | LL |

FIG. 19

EXAMPLE OF SUPPLY PLAN (UNTIL 14:00)

| CUSTOMER | APPLIANCE | POWER CONSUMPTION | TIME | DATE | SUPPLY PLAN | CONTROLLABLE APPLIANCE |
|---|---|---|---|---|---|---|
| CUSTOMER N | AIR CONDITIONER A | 0.5kWh | 10:50 | 2010/8/4 | CHANGE (+2°C) | ○ |
| | | | 12:00 | 2010/8/4 | CHANGE UNTIL 12:00 SCHEDULE | |
| | AIR CONDITIONER B | 0.4kWh | 10:50 | 2010/8/4 | SUPPLY | — |
| | AIR CONDITIONER C | 0.1kWh | 10:50 | 2010/8/4 | SUPPLY | — |
| | WASHING MACHINE | 0.1kWh | 10:50 | 2010/8/4 | SUPPLY | — |
| | LIGHTING (ROOM A) | 0.08kWh | 10:50 | 2010/8/4 | NO SUPPLY (OFF) | ○ |
| | | | 14:00 | 2010/8/4 | NO SUPPLY UNTIL 14:00 | |
| | DEVICE A | 0.02kWh | 10:50 | 2010/8/4 | SUPPLY | — |
| | EV CHARGE | 6.0kWh | 10:50 | 2010/8/4 | NO SUPPLY | ○ |
| | | | 12:00 | 2010/8/4 | SCHEDULE SUPPLY FROM 12:00 | |
| | LIGHTING | 3.0kWh | 10:50 | 2010/8/4 | SUPPLY (ON) | ○ |
| | | | 14:00 | 2010/8/4 | SUPPLY UNTIL 14:00 | |
| CUSTOMER A | AIR CONDITIONER A | 0.5kWh | 10:50 | 2010/8/4 | SUPPLY | — |
| | AIR CONDITIONER B | 0.4kWh | 10:50 | 2010/8/4 | NO SUPPLY | ○ |
| | | | 14:00 | 2010/8/4 | NO SUPPLY UNTIL 14:00 | |
| | AIR CONDITIONER C | 0.1kWh | 10:50 | 2010/8/4 | SUPPLY | — |
| | WASHING MACHINE | 0.1kWh | 10:50 | 2010/8/4 | SUPPLY | — |
| | LIGHTING (ROOM A) | 0.08kWh | 10:50 | 2010/8/4 | SUPPLY | — |
| | DEVICE A | 0.02kWh | 10:50 | 2010/8/4 | SUPPLY | — |

FIG. 20

SUPPLY-DEMAND BALANCE CONTROLLER

CROSS REFERENCE TO RELATED APPLICATIONS

This application is based upon and claims the benefit of priority from the prior Japanese Patent Application No. 2010-201987, filed on Sep. 9, 2010, the entire contents of which are incorporated herein by reference.

FIELD

Embodiments of the present invention relate to a supply-demand balance controller in a smart grid, for example.

BACKGROUND

There is known an interchange judging device which detects the difference between power demand and purchased power which cannot be predicted in the stage of creating a plan. When the quality of power cannot be maintained, the interchange judging device determines, in real time, the electric energy (i.e., power) quantity to be interchanged and another power system supply-demand controller requiring the power with minimum cost.

Each customer makes a contract about power demand having a predetermined value, and whether electric energy exceeding the contracted electric energy is used is judged by the interchange judging device.

There is a difference between the contracted power demand and actually required power demand, and thus the contract should be made considering the power demand not to be actually consumed. Therefore, there is a problem that this interchange judging device unnecessarily creates a plan for generating a great quantity of power. Excessive power generation requires a large-scale power storage to store the excessive power.

Further, when power is supplied from unstable power generating source such as solar power generating unit or wind-power power generating unit, there may be a case where a predetermined contracted electric energy cannot be supplied depending on the weather or weather conditions. There is a problem that the interchange judging device functioning in real time easily generates a request for additional power with strong possibility. Excessive supply of additional power requires a large-scale power storage store the excessive power.

Further, the following is known as another prior art. In this prior art, the target output value of each power generating unit is generated from the total output of power generation based on a load allocation calculation method. In this case, an expected value showing the predictive output value of power generation and a dispersion value representing the reliability of the expected value are used. When the reliability of the predictive value is high, the target output of power generation is calculated, by economic load allocation, to be highly economical requiring minimum fuel cost. On the other hand, when the reliability of the predictive value is low, reserve power generation of a distributed type power source is secured to calculate the target output of power generation with high flexibility.

In this prior art, the instability of solar power generation and wind-power power generation is expressed as reliability, and corresponding load allocation is changed depending on this reliability. In this case, the instability of the demand itself is not considered at all.

Accordingly, similarly to the above prior art, power not to be actually consumed is generated, which leads the possibility of generating excessive power as a result. Further, there is a problem that a large-scale power storage must be built and kept in the system to store the excessive power generated in this case.

BRIEF DESCRIPTION OF THE DRAWINGS

FIG. 4 shows a first example of demand data.
FIG. 5 shows a second example of demand data.
FIG. 6 shows a third example of demand data.
FIG. 7 shows a fourth example of demand data.
FIG. 8 shows a fifth example of demand data.
FIG. 9 shows a sixth example of demand data.
FIG. 10 shows a first example of controllable demand information.
FIG. 11 shows a second example of controllable demand information.
FIG. 13 shows a fourth example of controllable demand information.
FIG. 14 shows a fifth example of controllable demand information.
FIG. 19 shows an example of a controllable demand generating/stopping judgment table.
FIG. 20 shows an example of a created electric supply plan.

DETAILED DESCRIPTION

Figure 1:
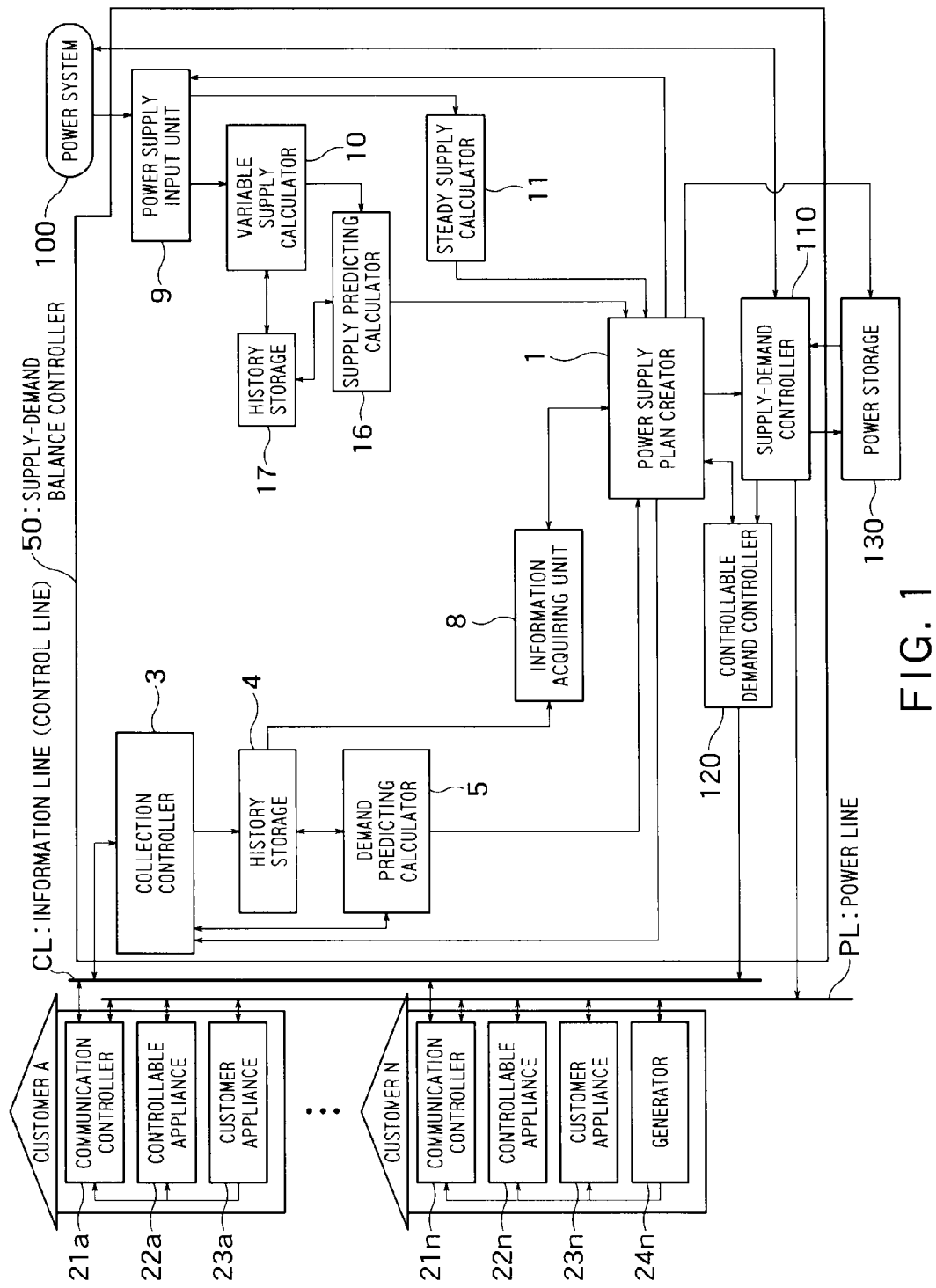
FIG. 1 is a block diagram of a supply-demand control system including a supply-demand balance controller according to a first embodiment.

According to an aspect of the embodiments, there is provided a supply-demand balance controller for creating an electric supply plan (power supply plan) in a predetermined period.

The controller includes: a collection controller, a first storage, a first predicting unit, a second storage, a first reliability value calculator, a power receiving unit, a distribution unit, a power supply acquiring unit, a third storage, a second predicting unit, a fourth storage, a second reliability value calculator, a balancing unit and a plan creator.

The collection controller collects, from each customer, power demand data showing power consumed by customer appliances in customer's buildings, the customer appliances including a controllable appliance whose power consumption can be controlled from outside;

The first storage stores a history of the power demand of each customer;

The first predicting unit predicts a power demand by each customer in the predetermined period, based on the history in the first storage;

The second storage stores a predictive power demand obtained by the first predicting unit;

The first reliability value calculators calculates a reliability value for the predictive power demand calculated by the first predicting unit with respect to each customer, based on a difference between the power demand previously stored in the first storage and the predictive power demand previously obtained by the first predicting unit with respect to the previous power demand;

The power receiving unit receives power supply from a power system, the power system generating power with a plurality of power generating units;

The distribution unit distributes the power received at the power receiving unit to the customers.

The power supply acquiring unit acquires data concerning power supply from the power system with respect to each power generating unit.

The third storage stores a history of power supply with respect to each power generating unit.

The second predicting unit predicts power to be supplied in the predetermined period with respect to each power generating unit, based on the history stored in the third storage.

The fourth storage stores data of predictive power supply obtained by the second predicting unit.

The second reliability value calculator calculates a reliability value for the predictive power supply obtained by the second predicting unit with respect to each power generating unit, based on a difference between the power supply previously stored in the third storage and the predictive power supply previously obtained by the second predicting unit with respect to the previous power supply.

The balancing unit obtains a supply-demand margin level based on a difference between: a first weighted sum of the predictive power demand calculated by the first predicting unit by weight depending on the reliability value calculated by the first reliability value calculator; and a second weighted sum of the predictive power supply calculated by the second predicting unit by a weight depending on the reliability value calculated by the second reliability value calculator.

The plan creator creates a plan for controlling power used by the controllable appliances of each customer in the predetermined period, based on the supply-demand margin level.

Hereinafter, embodiments of the present invention will be explained referring to the drawings.

First Embodiment

Figure 2:
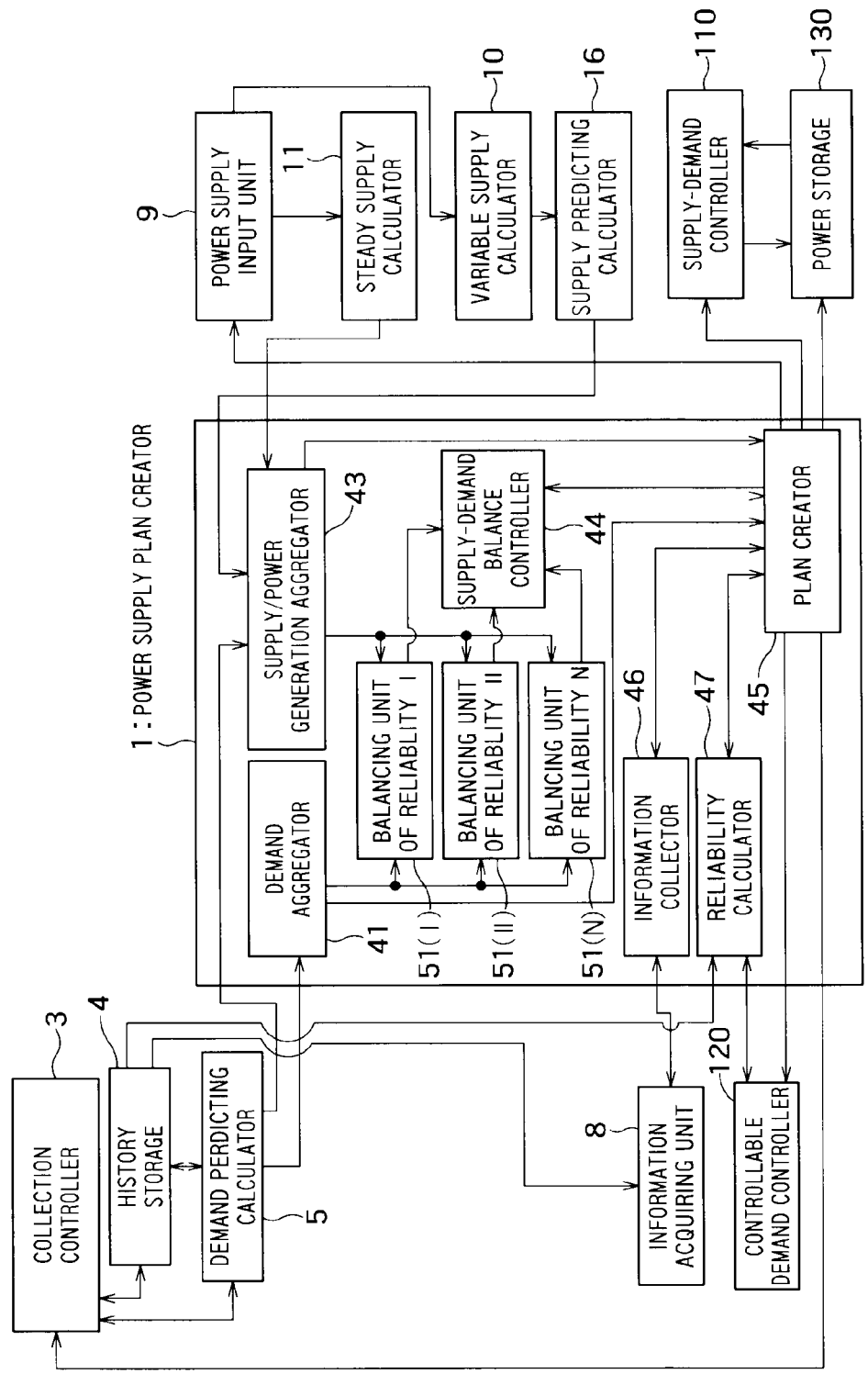
FIG. 2 is a block diagram of an electric supply plan creator in the supply-demand balance controller of FIG. 1.

FIG. 1 is a block diagram of a supply-demand control system including a supply-demand balance controller according to a first embodiment. FIG. 2 is a block diagram of an electric supply plan creator 1 in a supply-demand balance controller 50 of FIG. 1.

This supply-demand balance controller appropriately predicts power demand from a plurality of customers and power supply from a power system to appropriately control the power consumption of controllable appliance of each customer while appropriately requesting additional power from a power system such as a smart grid and discharging/charging a power storage. In this way, electric energy supply and power demand are balanced, and thus extra power generated by the power system and excessive power supply from the power system can be reduced while reducing the size of the power storage.

The supply-demand balance controller 50 is connected to a power system 100 such as a smart grid, a power storage 130 for storing power, and a plurality of customers A to N.

The power system 100 includes a plurality of power generating units, and generates power by these power generating units. The power generating units includes many power generating units such as nuclear power generating unit, hydraulic power generating unit, thermal power generating unit, wind-power power generating unit, solar power generating unit, wave-power power generating unit, and geothermal power generating unit.

The power system 100 transmits, to the supply-demand balance controller 50, power supply data including power supply (available electric energy supply) of each power generating unit. The power supply data is transmitted periodically or depending on the request issued from the supply-demand balance controller 50.

The supply-demand balance controller 50 receives the power supply data by a power supply input unit (power supply acquiring unit, addition requesting unit) 9. The power supply data includes a label for identifying the power generating unit, and a schedule of electric energy supply from the power generating unit.

The schedule may have various formats. It may concern power in the future time period, power currently supplied, or power supplied for a predetermined period from the present. The predetermined time period may have a format specifying a concrete time period from OO:OO to XX:XX or a format specifying 15 minutes after OO:OO.

The power system 100 transmits the generated power to an supply-demand controller (power receiving unit, distribution unit) 110 through a power transmission line (not shown). The supply-demand controller 110 supplies the power to customers through a power line PL and charges the power storage 130 with the power as needed. Further, the supply-demand controller 110 discharges the power storage 130 as needed in order to supply the power drawn therefrom to customers.

Customers A to N are connected to the supply-demand balance controller 50 through an information line (control line) CL and the power line PL. The information line CL transmits data or control signal between the customers A to N and the supply-demand balance controller 50. The power line PL transmits power from the supply-demand controller 110 in the supply-demand balance controller 50 to the customers A to N.

The customers A to N have communication controllers 21a to 21n. Further, the customers A to N have customer appliances 22a to 22n and controllable appliances 23a to 23n as power consuming appliances.

The operation (power consumption) of the controllable appliance can be adjusted (controlled) from the outside. Such a controllable electric energy is called controllable demand.

Some or all customers have power generators such as a solar power generation panel. In the example of FIG. 1, the customer N has a power generator 24n. Similarly, some of the other customers have power generators.

The communication controllers 21a to 21n communicate with the customer appliances 22a to 22n and the controllable appliances 23a to 23n to control these appliances. Further, the communication controllers 21a to 21n read and transmit detailed information of the customer appliances 22a to 22n and the controllable appliances 23a to 23n depending on the request from the supply-demand balance controller. The detailed information of the controllable appliances 23a to 23n includes controllable demand information (see FIG. 10 to FIG. 14) to be explained later.

The communication controllers 21a to 21n acquire demand data including power consumption of each of the customer appliances 22a to 22n and the controllable appliances 23a to 23n. The communication controllers 21a to 21n may acquire demand data including the total power consumption of the customer appliances 22a to 22n and the controllable appliances 23a to 23n. The power consumption of each or all of the appliances can be acquired by using various well-known methods. For example, the acquisition can be realized by using a distribution board. Further, the communication controller of a customer having a power generator acquires the power generation data of the power generator.

The communication controllers 21a to 21n can transmit, to the supply-demand balance controller 50, detailed appliance information including demand data, power generation data, and controllable demand information, the transmission being performed periodically or depending on the request from the supply-demand balance controller 50.

Figure 3:
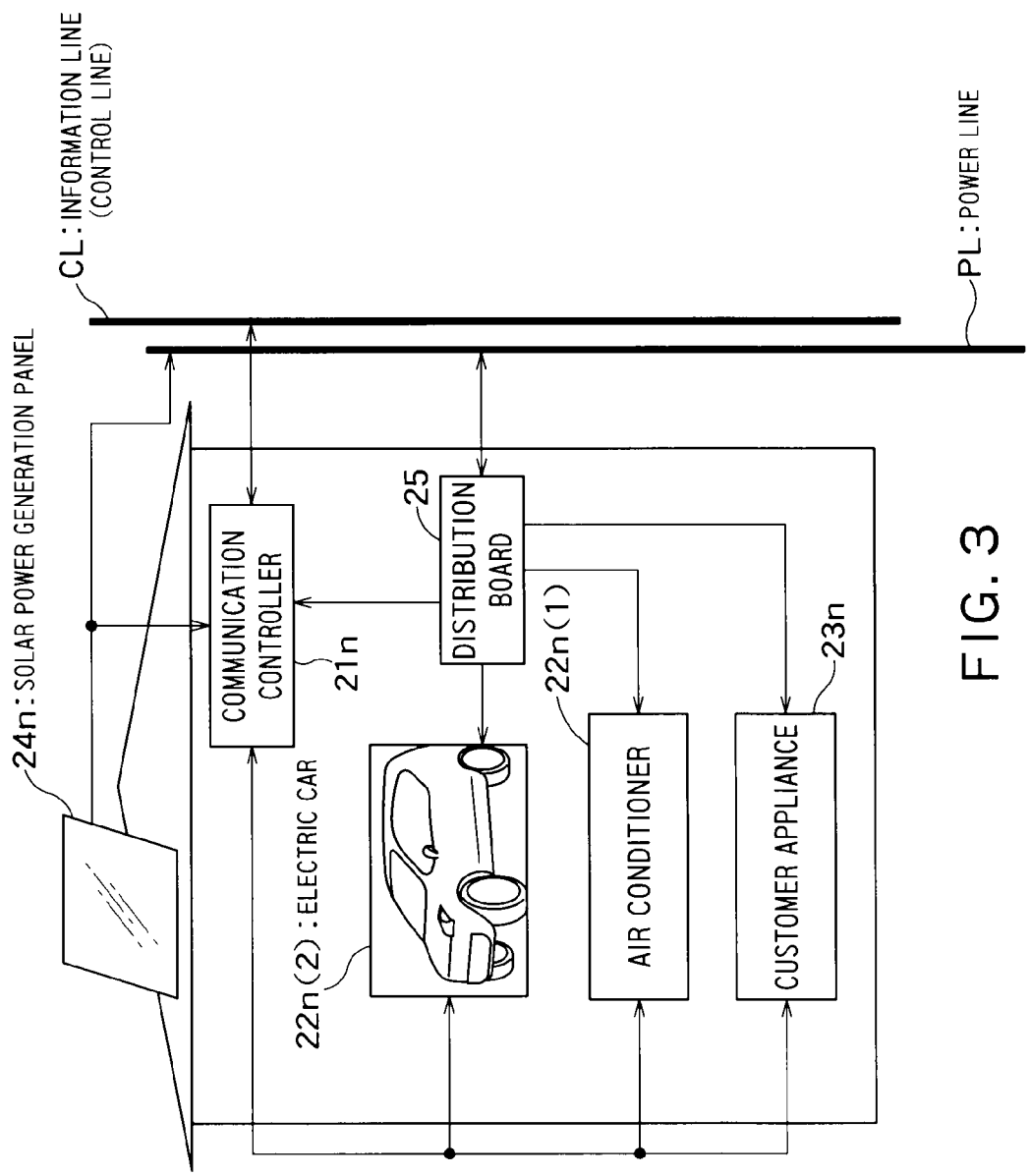
FIG. 3 shows an example of concrete appliances of a customer.

FIG. 3 shows an example of concrete appliances of the customer N.

An air conditioner 23n(1) and an electric car 23n(2) are arranged as controllable appliances. A solar power generation panel 24n is arranged as a power generator. In this case, the customer appliance 22n in not limited to a specific appliance. Note that the customer appliance 22n is a normal appliance which cannot be controlled from the outside (namely, a controllable demand controller 120).

Further, a distribution board 25 is arranged to receive, from the supply-demand controller 110, power generated by the power system 100 or power discharged from the power storage 130 through the power line PL. The distribution board 25 distributes the received power to the appliances 22n(1), 22n(2), and 23n and the communication controller 21n consuming power in the customer's building. The distribution board 25 measures power used by each appliance, and notifies the communication controller 21n about the measured value (power consumption) of each or all of the appliances.

The communication controller 21n receives, from the distribution board 25, the demand data including the power consumption of each or all of the appliances, and transmits the demand data to the supply-demand balance controller through the information line CL. Further, the communication controller 21n reads the detailed information of the appliances 23n(1), 23n(2), and 22n from these appliances, and transmits the detailed information to the supply-demand balance controller 50 through the information line CL. Particularly, the communication controller 21n transmits, to the supply-demand balance controller 50, the controllable demand information of the controllable appliances, namely the air conditioner and electric car. Further, the communication controller 21n transmits, to the supply-demand balance controller 50, the power generation data of the solar power generation panel 24n.

Hereinafter, some examples will be shown about the demand data and the controllable demand information. Note that the demand data and the controllable demand information may have various formats, and are not limited to the following examples.

FIG. 4 to FIG. 9 shows examples of the demand data.

FIG. 4 shows a first example of the demand data.

This example shows the demand data when acquiring power consumption of each customer appliance of each customer at a specific time. Note that the occurrence accuracy and reliability of each demand are shown in the "type" field. This reliability value is calculated by the customer appliance in a similar way to a reliability-level-based demand aggregator 41 to be explained later (see FIG. 2). The occurrence accuracy is determined depending on the level of reliability. In the present embodiment, reliability I shows high accuracy, and reliability having a level of II or thereafter shows variation. The meaning of the reliability and the occurrence accuracy will be clearly explained later.

FIG. 5 shows a second example of the demand data.

This example shows the demand data when acquiring the power consumption amount in a predetermined time interval.

FIG. 6 shows a third example of the demand data. FIG. 7 shows a fourth example of the demand data.

Each of the third and fourth examples shows the demand data when presenting the power consumption or power consumption amount classified according to the kind of the customer appliance.

FIG. 8 shows a fifth example of the demand data. FIG. 9 shows a sixth example of the demand data.

Each of the fifth and sixth examples shows the demand data when the total power consumption or total power consumption amount can be acquired with respect to each customer.

Each of FIG. 10 to FIG. 14 shows a data example of the controllable demand information of the controllable appliance.

FIG. 10 shows a first example of the controllable demand information.

A plurality of fields are defined for each controllable appliance of the customer.

The term "maximum power consumption amount" means the maximum power consumption amount when power is not controlled, and the term "minimum power consumption amount" means the minimum power consumption amount when power consumption is restrained by controlling power. By notifying the maximum/minimum power consumption amount of each controllable appliance, the supply-demand balance controller 50 can correctly estimate restrainable electric energy when performing the control, as will be explained later.

The terms "set start time" and "set finish time" define a controllable time period.

Further, the term "type" shows controllable conditions. In this example, EV can be always controlled within a specific time period, ON/OFF of lighting appliance can be arbitrarily controlled, and internal settings of air conditioner A can be freely changed.

FIG. 11 shows a second example of the controllable demand information.

This example is almost similar to FIG. 10, but is different in that the maximum power consumption amount and the minimum power consumption amount are not defined.

Figure 12:
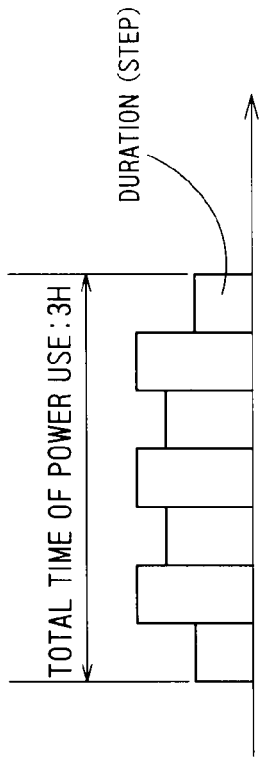
FIG. 12 shows a third example of controllable demand information.

FIG. 12 shows a third example of the controllable demand information.

This example shows controllable demand information in which a power demand having a specific pattern is generated within a specific time period.

The example shows a demand for charging an electric car in a specific pattern formed of seven steps, and the start timing of each step can be arbitrarily controlled. The start time of each step can be controlled depending on the state of power supply as long as these seven steps are completed within the specified time period.

FIG. 13 shows a fourth example of the controllable demand information.

This example shows the controllable demand information in which the conditions for the state of customer appliance at the point of set finish time are specified. In the example data, conditions are given so that SOC (state of charge) of a cell becomes a predetermined state.

FIG. 14 shows a fifth example of the controllable demand information.

This example shows the controllable demand information in which the controllable demand is notified as power supply adjustment surplus energy when the customer owns a building having a unique energy management system.

FIG. 14 shows cases which can be achieved at an arbitrary time within a specified time: a case where power can be managed by utilizing an energy management system or a storage battery in the building even when power supply is zero; a case where specific power can be reduced all the time; and a case where the possible reduction rate of power to be generated in the future is specified.

A power-demand/generation data collection controller (hereinafter referred to as collection controller) 3 acquires (collects) the demand data and power generation data from the customers A to N through the information line CL. Further, the collection controller 3 collects the controllable demand information from the customers A to N. The collection is performed depending on the data collection request issued from the electric supply plan creator 1 at a predetermined timing or at predetermined intervals (e.g. Ts minute intervals). For simplification, in the following explanation, the demand data from the customers A to N includes the power demand of each appliance if not otherwise specified. Further, the power generation data from the customer includes power generation of each power generator.

A power-demand/generation history storage (hereinafter referred to as history storage) 4 stores the history of the data (demand data, power generation data) collected by the collection controller 3. That is, the history storage 4 stores and retains also previously collected data. The history storage 4 stores the demand data and power generation data previously collected and the demand data and power generation data newly inputted while distinguishing the data according to each customer and each device. Further, the history storage stores the controllable demand information with respect to each controllable appliance of the customer. The history storage 4 corresponds to a first storage and a second storage.

A variable demand and power generation predicting/reliability value calculator (hereinafter referred to as demand & predicting calculator) 5 predicts the demand of each customer appliance and the power generation of each power generator with respect to each customer by using the history of the history storage 4, thereby predictive demand and predictive power generation being obtained. Further, the demand & predicting calculator 5 calculates the reliability value of each of the predictive demand and predictive power generation. The demand & predicting calculator (first predicting unit, first reliability value calculator) 5 stores the values of the predictive demand and the predictive power generation in the history storage 4.

The demand is predicted for interval k+1 following the present interval k and subsequent intervals as needed, the intervals being obtained by dividing the future time by time ΔT. In other words, the demand in the next interval is predicted from the demand in a plurality of previous time intervals with respect to the present time interval. Conversely, in the present interval, the plan (supply-demand control) determined in the interval preceding the present interval is simultaneously carried out. The interval k+1 corresponds to a target predetermined period of plan creating.

Figure 15:
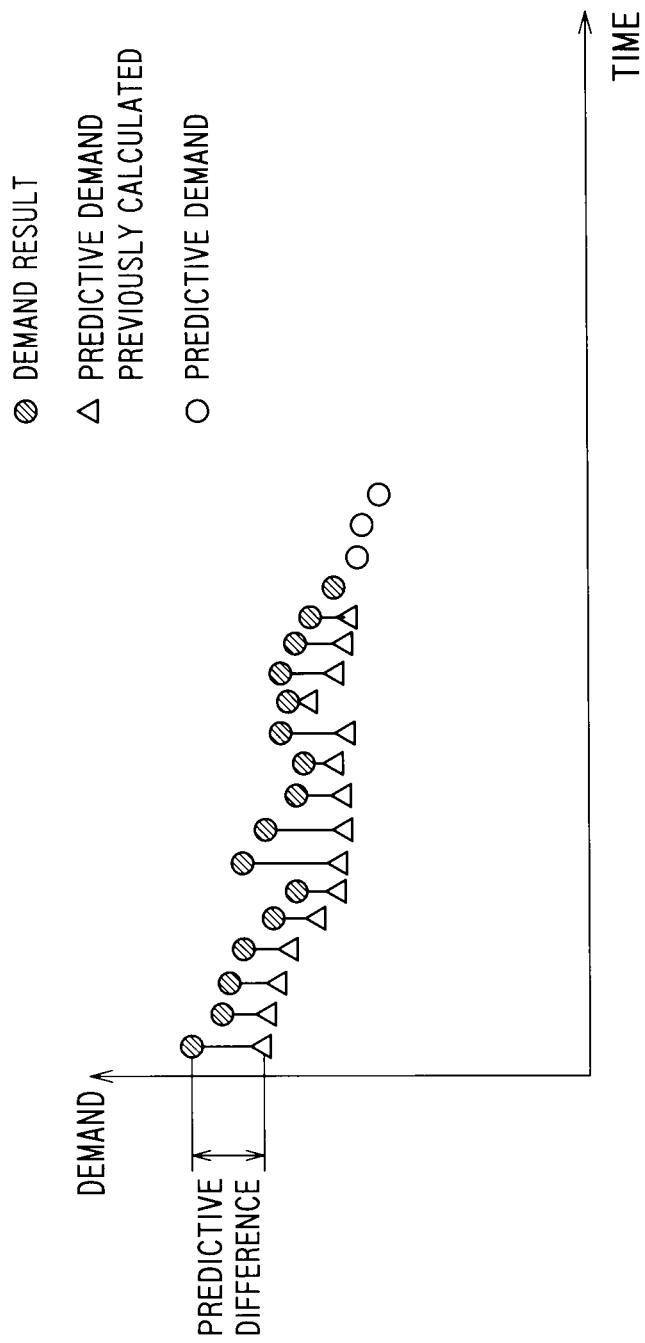
FIG. 15 schematically shows how to predict demand.

The predicting method will be concretely explained. A predictive model is constructed so that the demand in the interval following a certain time interval is predicted from the demand in a plurality of previous time intervals. Then, the demand in the next interval k+1 is predicted from this predictive model and the demand in the previous time intervals with respect to the present interval k. FIG. 15 schematically shows how the demand is predicted as the interval proceeds ("predictive difference" described in the drawing will be explained later). There are many known models for predicting the future value from the past value, and any model may be used. Hereinafter, a simple example will be shown as to a case using linear regression.

A regression model is defined to predict the demand in interval h+1 from the sum of constant term A0 and the linear combination of variables $X_{h-1}, X_{h-2}, X_{h-3}, \ldots, X_{h-s}$ representing the demand (results) in a plurality of intervals h−1, h−2, h−3, . . . , h−s with variables' coefficients $A_{h-1}, A_{h-2}, A_{h-3}, \ldots, A_{h-s}$. Here, the interval h−x means the interval preceding the interval h by x intervals. The coefficient and constant term of this regression model may be obtained by a least-square method. By using this regression model, the demand in the interval k+1 is predicted from the demand in the intervals k−1, k−2, k−3, . . . , k−s. The interval k−x means the interval preceding the interval k by x intervals (i.e. the interval preceding the present interval k by x intervals). A residual term may be added to the above regression model. The length of each interval is the same, namely ΔT. In a similar way to the above, it is also possible to construct an arbitrary predictive model to predict the demand in the interval after the interval k+1 such as the interval k+2 and interval k+3 from the demand (results) in a plurality of previous intervals preceding the present interval k. In the present embodiment, the predictive demand in the interval k+1, interval k+2, and interval k+3 are obtained.

The interval k+1 corresponds to a first time interval, a plurality of time intervals including the interval k+1, interval k+2, and interval k+3 correspond to a second time interval.

The prediction can be performed by using not only the regression model but also a classifier such as a decision tree, for example. In this case, after discretizing the demand, the classifier is created to obtain the demand in the interval h+1 from a plurality of intervals h−1, h−2, h−3, . . . , h−s. As the width of discretization becomes smaller, the prediction can be performed with higher granularity. Note that the method for creating such a classifier is well known, and thus the explanation thereof will be omitted.

The predictive power generation can be calculated completely similarly to the predictive demand, and thus detailed explanation thereof will be omitted. For reference, FIG. 16 shows how the power generation is predicted as the interval proceeds.

The reliability value of the predictive demand can be calculated by using the difference between a previous predictive value (i.e. the predictive demand predicted in the past) and a previous demand value (i.e. result value). When the prediction is performed on a plurality of intervals k+1, k+2, and k+3 as in this example, there are a plurality of previous predictive values in the same interval. For example, when the predictive value in a certain interval h is calculated totally three times when the present interval was h−3, h−2, and h−1, the interval h has three predictive values. In this case, the average of three predictive values or an arbitrary predictive value may be employed.

Figure 17:
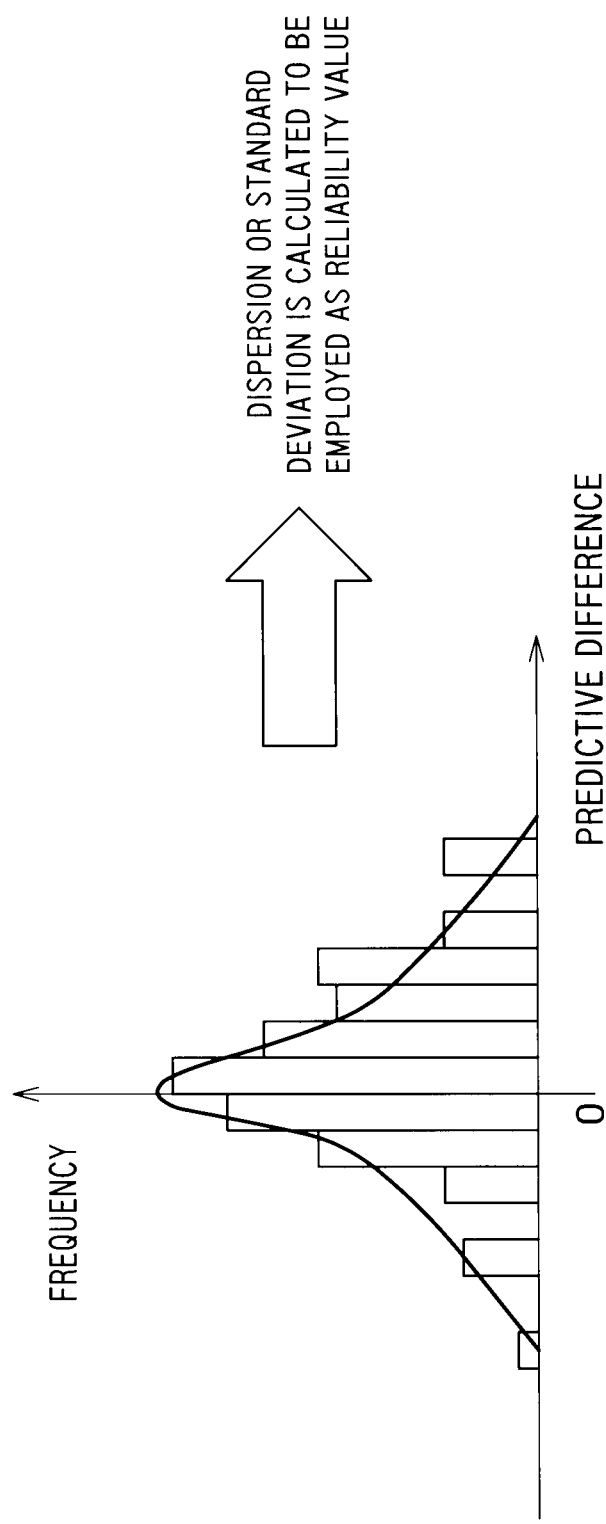
FIG. 17 shows a method for calculating the reliability value of the predictive demand.

FIG. 17 is a diagram to explain a method for calculating the reliability value of the predictive demand.

Figure 16:
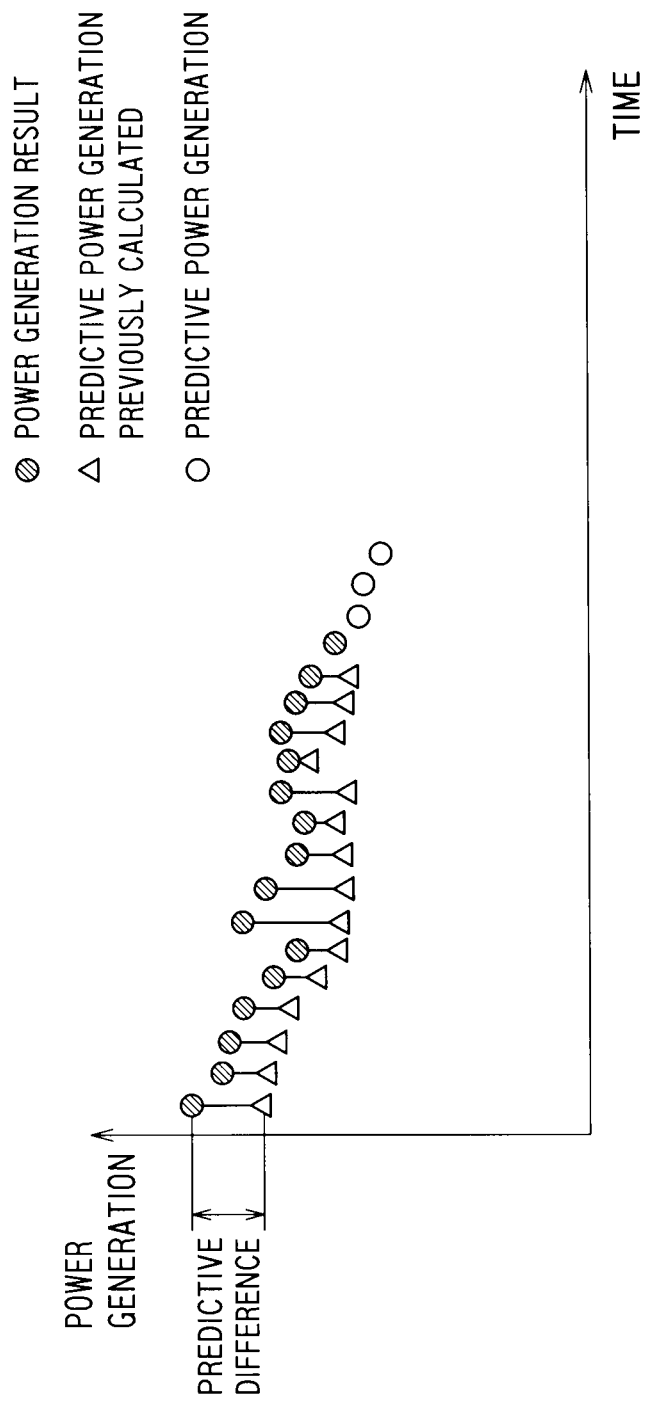
FIG. 16 schematically shows how to predict power generation.

The result value and the predictive value are used to obtain the difference (predictive difference) between the predictive value and the result value in each of a plurality of intervals preceding the present interval k with respect to each customer (see FIG. 15 and FIG. 16). The previous intervals are a predetermined number of successive intervals from the interval immediately preceding the present interval k, for example.

After obtaining the predictive difference in each of the previous intervals as stated above, the frequency distribution of the predictive difference is created as shown in the drawing. The dispersion value or standard deviation of the predictive difference is calculated from this frequency distribution. The calculated dispersion value or standard deviation is used to obtain the predictive reliability value.

The predictive reliability value is obtained by using a calculation formula in which the reliability value increases as the dispersion value or standard deviation becomes smaller. For example, the reliability value can be obtained by using the dispersion value based on the following formula. W is an arbitrary constant. All of the intervals k+1, k+2, and k+3 have the same reliability value.

$$\text{Reliability value } R = \log 10(W/\text{dispersion value}) \quad \text{Formula (1)}$$

Further, the reliability value may be obtained by using the reliability values obtained in the previous intervals, as in the following Formula (2).

$$\text{Reliability value: } Rs = a1 \times R(k) + a2 \times R(k-1) + a3 \times R(k-2) \quad \text{Formula (2)}$$

R(k): the reliability value calculated in the present interval (interval k) (i.e. the reliability value obtained at present)

R(k−1): the reliability value calculated in the interval k−1 (i.e. the reliability value obtained in the interval preceding by one interval)

R(k−2): the reliability value calculated in the interval k−2 (i.e. the reliability value obtained in the interval preceding by two intervals)

a1, a2, a3: arbitrary coefficients (the relationship of a1>a2>a3 may be established)

The demand having a high reliability value is regarded to show that the demand or its approximate demand will be generated with high probability, which leads to high occurrence accuracy. On the other hand, the demand having a low reliability value is regarded to show that the demand or its approximate demand will be generated without high occurrence accuracy, which leads to possibility of large variation.

A method for calculating the reliability value of the predictive demand was shown in the above, and the reliability value of the predictive power generation can be completely similarly calculated. Therefore, detailed explanation thereof will be omitted.

The demand & predicting calculator 5 transmits the predictive demand of each customer and its reliability value to the reliability-level-based demand aggregator 41 of the electric supply plan creator 1.

Further, the demand & predicting calculator 5 transmits the predictive power generation of each customer and its reliability value to a reliability-level-based supply/power generation aggregator 43 of the electric supply plan creator 1.

A information acquiring unit 8 acquires the controllable demand information of each controllable appliance of each customer from the history storage 4 depending on the request from the electric supply plan creator 1, and transmits the information to a controllable demand information collector 46 of the electric supply plan creator 1.

The power supply input unit 9 requests the power system 100 to transmit the power supply data, and receives the power supply data from the power system 100. The power supply input unit 9 transmits the request to the power system 100 in response to the request issued from the electric supply plan creator 1 at a predetermined timing or at predetermined intervals (e.g. Ts minute intervals). The power supply input unit 9 transmits the received power supply data to a variable supply calculator 10 and a steady supply calculator 11.

The steady supply calculator 11 extracts, from the received power supply data, the electric energy supply of a power generating unit supplying power stably (with high accuracy). Which power generating unit stably supplies power among a plurality of power generating units in the power system 100 is previously determined. In this example, a power generating unit such as a nuclear power generating unit (high-accuracy power generating unit) is regarded as stably supplying power. The steady supply calculator 11 transmits a set consisting of the extracted electric energy supply and the identification label of the power generating unit (nuclear power generating unit etc. in this case) to the reliability-level-based supply/power generation aggregator 43 of the electric supply plan creator 1. The power supply data includes the power supply from the high-accuracy power generating unit at least in the intervals k+1, k+2, and k+3.

The variable supply calculator 10 extracts, from the received power supply data, the electric energy supply of the power generating unit supplying power unstably (i.e. with a possibility of largely variation). In the present embodiment, available electric energy supply is extracted from power generating units (variable power generating units) such as thermal power generating unit, wind-power power generating unit, and solar power generating unit. The variable supply calculator 10 relates the extracted available electric energy supply of each power generating unit to the identification label of each power generating unit, and transmits the information to a Supply predicting calculator (second predicting unit, second reliability value calculator) 16. In this example, the power supply data includes the present electric energy supply as power supply from the variable power generating unit.

A history storage 17 stores the history of the electric energy supply of each variable power generating unit extracted by the variable supply calculator 10. Note that the history storage 17 may store the history of the electric energy supply of the high-accuracy power generating unit extracted by the steady supply calculator 11. The history storage 17 corresponds to a third storage and a fourth storage.

A Supply predicting calculator (second predicting unit, second reliability value calculator) 16 predicts the supply of each variable power generating unit by using the history of the history storage 17, thereby the predictive supply being obtained. Further, the Supply predicting calculator 16 calculates the reliability value of the predictive supply. The predictive supply may be obtained by a regression analysis etc. using the previous supplies, as when predicting the demand as stated above. In this way, the predictive supplies in the intervals k+1, k+2, and k+3 are calculated. Further, the reliability value is calculated based on the difference between the result value and the predictive value, as when calculating the reliability value of the demand.

The Supply predicting calculator 16 transmits these calculated predictive supply and reliability value to the reliability-level-based supply/power generation aggregator 43 in the electric supply plan creator 1. Further, the Supply predicting calculator 16 stores these calculated predictive supply and reliability value in the history storage 17.

Here, in the above example, the power supply data from the high-accuracy power generating unit includes the predictive supply in the required intervals (intervals k+1, k+2, and k+3 in this example), but there may be a case where the required intervals are not included partially or entirely. In this case, the predictive supply and the reliability value of the high-accuracy power generating unit may be calculated similarly to the variable power generating unit.

The electric supply plan creator 1 shown in FIG. 2 includes: the reliability-level-based demand aggregator 41; the reliability-level-based supply/power generation aggregator 43; supply-demand balancing units 51(I) to 51(N), a supply-demand balance controller 44, a plan creator 45, the controllable demand information collector 46; and a controllable demand reliability calculator 47. The electric supply plan creator 1 can be formed of a CPU, for example.

The reliability-level-based demand aggregator 41 classifies the predictive demand of each appliance of each customer into a plurality of groups depending on its reliability value. The groups include reliability I group, reliability II group, . . . , and reliability N (N is an integer of II or greater) group. The reliability is high in the order of reliability I, II, . . . , N.

The classification into the reliability I to N groups can be achieved based on the following standards when calculating the reliability value Rs by the above Formula (1). Note that the following standards relate to a case where N is 3. In other words, possible values for the reliability value Rs are divided into a plurality of ranges (100<Rs, 10<Rs≤100, Rs≤10), and the group of the appliance is determined by the range including the reliability value.

Reliability I group: 100<Rs
Reliability II group: 10<Rs≤100
Reliability III group: Rs≤10

The reliability-level-based demand aggregator 41 sums the classified predictive demand of each reliability group. In this way, the total predictive demand of each reliability group is obtained. More specifically, the total predictive demand in each of the intervals k+1, k+2, and k+3 is obtained with respect to each reliability group.

The reliability-level-based demand aggregator 41 transmits the total predictive demand calculated on the reliability I group to a supply-demand balancing unit 51(I) having reliability I.

Similarly, the reliability-level-based demand aggregator 41 transmits the total predictive demand calculated on the reliability II to N groups to supply-demand balancing units 51(II) to 51(N) having reliability II to N respectively.

The reliability-level-based supply/power generation aggregator 43 classifies the predictive power generation of each customer received from the demand & predicting calculator 5 into the reliability I to N groups depending on each reliability value.

Further, the reliability-level-based supply/power generation aggregator 43 classifies the predictive supply of each power generating unit (variable power generating unit) received from the Supply predicting calculator 16 into the reliability I to N groups depending on each reliability value.

Furthermore, the reliability-level-based supply/power generation aggregator 43 classifies the predictive supply of each power generating unit (high-accuracy power generating unit) received from the steady supply calculator 11 to the reliability I group.

The reliability-level-based supply/power generation aggregator 43 sums the predictive power generation and predictive supply with respect to each reliability group. In this way, the total predictive supply/power generation in each of the intervals k+1, k+2, and k+3 can be obtained with respect to each reliability group.

The reliability-level-based supply/power generation aggregator 43 transmits the total predictive supply/power generation calculated on the reliability I group to the reliability I supply-demand balancing unit 51(I).

Similarly, the reliability-level-based supply/power generation aggregator 43 transmits the total predictive supply/power generation calculated on the reliability II to N groups to the supply-demand balancing units 51(II) to 51(N) having reliability II to N respectively.

Figure 18:
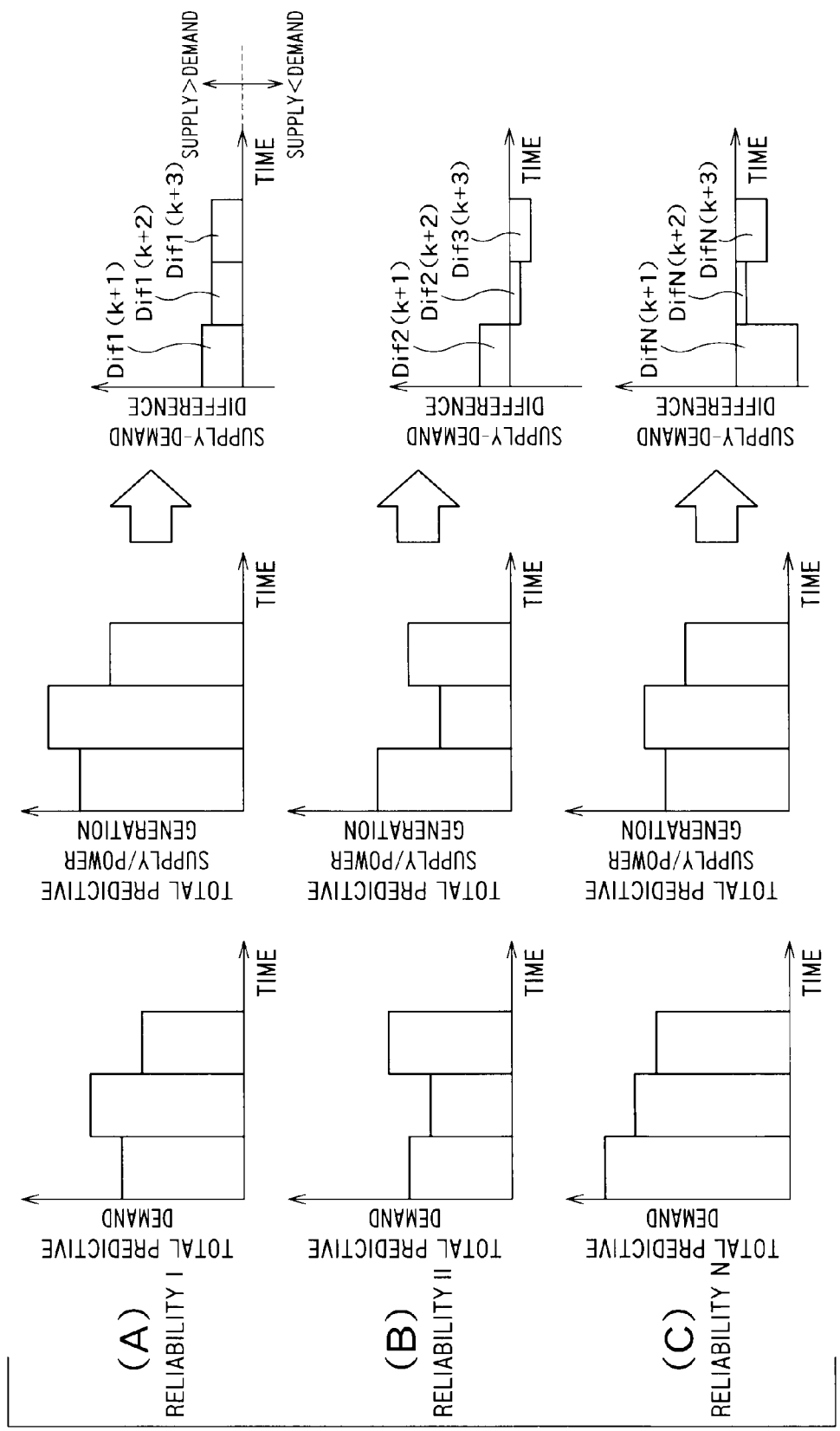
FIG. 18 shows the operation of a supply-demand balancing unit.

The operation of the supply-demand balancing units 51(I) to 51(N) will be explained using FIG. 18(A) to FIG. 18(B). FIG. 18(A) shows the operation of the reliability I supply-demand balancing unit 51(I). FIG. 18(B) shows the operation of the supply-demand balancing unit 51(II) having reliability II. FIG. 18(C) shows the operation of the supply-demand balancing unit 51(N) having reliability N.

In FIG. 18(A), the reliability I supply-demand balancing unit 51(I) calculates the difference (supply-demand difference) between the total predictive supply/power generation and the total predictive demand in each of the intervals k+1, k+2, and k+3 (i.e. at $\Delta T$ intervals). Dif1($k$+1), Dif1($k$+2), Dif1($k$+3) shows the supply-demand differences in the intervals k+1, k+2, and k+3 respectively.

As stated above, the interval k+1 is a target interval of plan creating. The interval k+2 is the interval temporally following the interval k+1 (interval advanced by $\Delta T$), and the interval k+3 is the interval following the interval k+2.

Similarly, as shown in FIG. 18(B), the supply-demand balancing unit 51(II) having reliability II calculates the difference (supply-demand difference) between the total predictive supply/power generation and the total predictive demand in each of the intervals k+1, k+2, and k+3 (i.e. at $\Delta T$ intervals). Dif2($k$+1), Dif2($k$+2), and Dif2($k$+3) shows the supply-demand differences in the intervals k+1, k+2, and k+3 respectively.

Further similarly, as shown in FIG. 18(C), the supply-demand balancing unit 51(N) having reliability N calculates the difference (supply-demand difference) between the total predictive supply/power generation and the total predictive demand in each of the intervals k+1, k+2, and k+3 (i.e. at $\Delta T$ intervals). DifN(k+1), DifN(k+2), and DifN(k+3) show the supply-demand differences in the intervals k+1, k+2, and k+3 respectively.

The reliability I supply-demand balancing unit 51(I) transmits the supply-demand differences Dif1($k$+1), Dif1($k$+2), and Dif1($k$+3) each having reliability I to the supply-demand balance controller 44.

Similarly, the supply-demand balancing units 51(II) to 51(N) having reliability II to N transmit, to the supply-demand balance controller 44, the supply-demand differences Dif2($k$+1), Dif2($k$+2), and Dif2($k$+3) each having reliability II to the supply-demand differences DifN(k+1), DifN(k+2), and DifN(k+3) each having reliability N.

The supply-demand balance controller 44 calculates a short-term supply-demand margin level Ms and a long-term supply-demand margin level Ml based on the supply-demand differences in the intervals k+1, k+2, and k+3 received from the supply-demand balancing units 51(I) to 51(N) respectively. Formula examples for calculating the short-term supply-demand margin level Ms and the long-term supply-demand margin level Ml will be shown below. The short-term supply-demand margin level Ms corresponds to a first supply-demand margin level, and the long-term supply-demand margin level Ml corresponds to a second supply-demand margin level.

Short-Term Supply-Demand Margin Level:

$$Ms = \alpha1 \times \mathrm{Dif}1(k+1) + \alpha2 \times \mathrm{Dif}2(k+1) + \ldots + \alpha N \times \mathrm{Dif}N(k+1) \quad \text{Formula (2)}$$

Long-Term Supply-Demand Margin Level:

$$Ml = \alpha1 \times \mathrm{Dif}1(k+1) + \alpha2 \times \mathrm{Dif}2(k+1) + \ldots + \alpha N \times \mathrm{Dif}N(k+1) + \beta1 \times \mathrm{Dif}1(k+2) + \beta2 \times \mathrm{Dif}2(k+2) + \ldots + \beta n \times \mathrm{Dif}N(k+2) + \gamma1 \times \mathrm{Dif}1(k+3) + \gamma2 \times \mathrm{Dif}2(k+3) + \ldots + \gamma n \times \mathrm{Dif}N(k+3) \quad \text{Formula (3)}$$

$\alpha1, \alpha2, \ldots, \alpha N$ are coefficients (weights) determined depending on the reliability I, II, ..., N respectively. The relationship of $\alpha1 > \alpha2 > \ldots > \alpha N$ is established.

$\beta1, \beta2, \ldots, \beta N$ are coefficients (weights) determined depending on the reliability I, II, ..., N respectively. The relationship of $\beta1 > \beta2 > \ldots > \beta N$ is established.

$\gamma1, \gamma2, \ldots, \gamma N$ are coefficients (weights) determined depending on reliability. The relationship of $\gamma1 > \gamma2 > \ldots > \gamma N$ is established.

As will be understood from the magnitude relation among the coefficients, larger weight is determined for higher reliability level group. That is, a larger weight is determined in the range corresponding to a higher reliability value.

In this case, the long-term demand margin level is obtained by using the data of intervals up to k+3, but it is also possible to obtain the long-term demand margin level by further using the data of the intervals starting from the interval k+4.

Formula (2) is established by using: the weighted sum (first weighted sum) of the predictive demand and the weights depending on the reliability; the weighted sum (second weighted sum) of the predictive supplies and the weights depending on the reliability; and the weighted sum (third weighted sum) of the predictive power generations and the weights depending on the reliability. Formula (2) is the same as the calculation to subtract the first weighted sum from the total sum of the second and third weighted sums with respect to the interval k+1.

Similarly to Formula (2), Formula (3) is the same as the calculation to subtract the first weighted sum from the total sum of the second and third weighted sums in order to sum the subtraction values of the intervals k+1, k+2, and k+3.

In the present embodiment, the group and reliability is judged depending on the range including the reliability value in order to use the weight depending on the reliability, but it is also possible to determine the weight directly from the reliability value without performing such a judgment. For example, larger weight is determined as the reliability value becomes larger (note that it is also possible to use the reliability value directly as the weight). In this case, it is not necessary to judge the range including the reliability value and to judge the group and reliability.

The supply-demand balance controller 44 transmits the calculated short-term supply-demand margin level Ms and long-term supply-demand margin level Ml to the plan creator 45. Further, the supply-demand balance controller 44 transmits, to the plan creator 45, the supply-demand differences in the intervals k+1, k+2, and k+3 calculated on each of the reliability I to N.

The controllable demand information collector 46 acquires the controllable demand information from the information acquiring unit 8, converts the acquired information into a format suitable for the process by the plan creator 45, and transmits the information to the plan creator 45.

The plan creator 45 creates a supply-demand control plan based on: the short-term supply-demand margin level Ms and the long-term supply-demand margin level Ml received from the supply-demand balance controller 44; the controllable demand information received from the controllable demand information collector 46; and the remaining electric energy of the power storage 130. The remaining electric energy of the power storage 130 is acquired by reading the value recorded in the power storage, for example.

First, the plan creator 45 determines a policy on the supply-demand control based on the short-term supply-demand margin level Ms and the long-term supply-demand margin level Ml. This determination is performed based on the controllable demand generating/stopping judgment table of FIG. 19, for example.

In the table of FIG. 19, the policy is determined depending on: the magnitude relation between the short-term supply-demand margin level Ms and −(minus) X1 and X2; and the magnitude relation between the long-term supply-demand margin level Ml and −(minus) Y1 and Y2. Each of X1, X2, Y1, and Y2 is a positive constant (threshold value).

When the short-term demand margin level Ms is less than −X1 (i.e. when short-term supply/power generation is largely deficient) and the long-term demand margin level Ml is less than −Y1 (i.e. the long-term supply/power generation is largely deficient), SSLS policy is determined. The SSLS policy restrains or stops the demand of the controllable appliance, and requests additional power from the power system.

When the short-term demand margin level Ms is less than −X1 and the long-term demand margin level Ml is −Y1 or greater, SS policy is determined. The SS policy restrains or stops the demand of the controllable appliance, and requests additional power from the power system depending on the remaining amount of the power storage (when the remaining amount has a value equal to or smaller than a constant value or smaller, for example).

When the short-term demand margin level Ms is −X1 or greater and the long-term demand margin level Ml is less than −Y1, LS policy is determined. The LS policy is restrains or stops the demand of the controllable appliance, and requests additional power from the power system depending on the remaining amount of the power storage (when the remaining amount has a value equal to or smaller than a constant value which is larger compared to the case of SS policy, for example).

When the short-term demand margin level Ms is −X1 or greater and less than X2 and the long-term demand margin level Ml is −Y1 or greater and less than Y2, LMSM policy is determined. The LMSM policy is means doing nothing. In this case, the controllable appliance operates as arbitrarily instructed by the user.

When the short-term demand margin level Ms is X2 or greater and the long-term demand margin level Ml is −Y1 or greater and less than Y2, SL policy is determined. The SL policy determines to charge the power storage. That is, power remains in the interval k+1 with strong possibility, and thus determination is made to confirm whether there is an available capacity to store the remaining power. When the available capacity has a value less than a threshold value, a supply stop instruction may be transmitted to the power system 100.

When the short-term demand margin level Ms is −X1 or greater and the long-term demand margin level Ml is Y2 or greater, LL policy is determined. The LL policy generates or increases the power demand of the controllable appliance (to charge EV, for example).

In the present embodiment, the policy is determined by using both of the short-term demand margin level Ms and the long-term demand margin level Ml, it is also possible to determine the policy based on only one of them.

Based on the policy determined as stated above, the plan creator 45 creates a plan for the controllable appliance of each customer, the power storage 130, and the power system 100. This creating is performed based on: the controllable demand information of the controllable appliance collected from each customer; the values of the short-term demand margin level and the long-term demand margin level; and the remaining amount of the power storage. In this case, both of the short-term demand margin level and the long-term demand margin level are used, but only one of them can be used.

The plan is basically created so that each of adjusted short-term demand margin level Ms and long-term demand margin level Ml is within a desired range. The adjusted short-term demand margin level and long-term demand margin level are obtained by performing subtraction or addition on the right-hand side of Formula (2) and Formula (3), based on the control amount adjusted with respect to each controllable appliance (the magnitude of reduction is added when the control is performed to reduce the demand, and the magnitude of increase is subtracted when the control is performed to increase the demand). When requesting additional power, addition electric energy to be requested is added to the right-hand side of Formula (2) and Formula (3). When discharging the power storage 130, the discharge amount is added to the right-hand side of Formula (2) and Formula (3).

The above desired range may be arbitrarily set. For example, the short-term demand margin level Ms may have a range which is equal to or greater than −X1 and less than X2, and the long-term demand margin level Ml may have a range which is equal to or greater than −Y1 and less than Y2. Alternatively, the short-term demand margin level Ms may have a constant range with respect to a predetermined value (between −X1 and X2, for example), and the long-term demand margin level Ml may have a constant range with respect to a predetermined value (between −Y1 and Y2, for example). Further, the desired range may be the predetermined value itself. In this case, a plan is created so that the short-term demand margin level Ms and the long-term demand margin level Ml approach the predetermined value.

As concrete plan, when the selected policy is to restrain or stop the demand of the controllable appliance, the demand of the controllable appliance is controlled. In this case, if each of the short-term demand margin level and the long-term demand margin level is not within the desired range even when the maximum control (to maximumly reduce power consumption) is performed on all controllable appliances, determination is made to use remaining electric energy of the power storage or to request additional power from the power system. Further, when the remaining capacity of the power storage has a value smaller than a constant value, additional power from the power system may be requested.

When each of the short-term demand margin level and the long-term demand margin level can fall within a desired range without performing the maximum control on all controllable appliances, the maximum control may be performed on only some of the controllable appliances. In this case, the order of the controllable appliances to be controlled may be determined in accordance with a predetermine priority or at random. Instead, the control may be sequentially performed in accordance with the reliability level of the group including the controllable appliances, starting from the reliability I group having high reliability.

Further, when each of the short-term demand margin level and the long-term demand margin level falls within a desired range without performing the maximum control on all controllable appliances, each of the controllable appliances may be controlled to gradually reduce its power consumption.

Further, when the selected policy is to generate or increase the power demand of the controllable appliance, the demand of the controllable appliance is increased (by lowering the temperature of the air conditioner in the summer, for example) as long as each of the short-term demand margin level and the long-term demand margin level can fall within a desired range. In this case, the order of the controllable appliances to be controlled may be determined in accordance with a predetermine priority or at random.

The plan creator 45 transmits, to the controllable demand controller 120, the control data of the controllable appliance of each customer shown by the created plan. Further, the created plan includes a request for additional power from the power system 100, a request for additional power is transmitted to the power system 100 through the power supply input unit 9. Further, the created plan shows power charge from the power storage 130, the power storage 130 is instructed to discharge power having an amount shown in the plan.

The controllable demand controller 120 stores therein the control data received from the plan creator 45. The controllable demand controller 120 controls the controllable appliance of each customer based on the control data.

FIG. 20 shows an example of the electric supply plan created for each customer. This electric supply plan shows a plan for 10:50 to 14:00. The customer N has four controllable appliances (air conditioner A, lighting (room A), EV, and lighting). The temperature of the air conditioner A is increased by +2° C. until 12:00 (power consumption is restrained), and this control is canceled after 12:00. Further, the lighting (room A) is turned off until 14:00 (demand is stopped). Power supply for charging the EV is stopped until 12:00, and this stop control is canceled after 12:00. The demand of the lighting is not particularly controlled. "Power consumption" in the drawing is the demand value predicted by this device.

Shown below is a case where "the reliability of the controllable demand" is used when creating the electric supply plan to further increase the reliability of the plan. That is, the plan creator 45 correctly estimates the controllable demand (reducible demand) by using the reliability of the controllable demand, thereby the accuracy of the plan being increased.

The reliability of the controllable demand is calculated depending on the difference between the demand predicted by the previous demand control (obtained by adding + or − control amount (adjustment level) determined at present to the precious predictive demand of the controllable appliance) and the actual electric energy consumed by the controllable appliance.

When the magnitude of the difference is less than a threshold value A, the report of the controllable appliance (i.e. the content of the controllable demand information) is judged to be reliable, and the highest reliability I is given to the controllable appliance. Similarly, the reliability II is given when the magnitude of the difference is equal to or greater than the threshold value A and less than a threshold value B, and the reliability III is given when the magnitude of the difference is equal to or greater than the threshold value B and equal to or less than a threshold value C. Similar operation is performed also in the case of reliability IV or greater.

Here, the reliability of the controllable demand is calculated by a controllable demand reliability calculator (hereinafter referred to as reliability calculator) 47. The reliability calculator 47 reads, from the history storage 4, the previous prediction and result value of the controllable appliance, and acquires the previous control amount from the controllable demand controller 120. The reliability calculator 47 calculates the difference between the result value and the past prediction added with the previous control amount. The reliability calculator 47 uses the calculated difference and the above threshold values A, B, C, etc. to calculate the reliability of the controllable demand. The difference may be calculated only on the interval preceding by one interval. Further, the difference may be calculated on a plurality of intervals including a further previous interval. In the latter case, the mean value of the differences obtained in the intervals is used.

The plan creator 45 determines the control of the controllable appliance so that each of the short-term demand margin level and the long-term demand margin level falls within a desired range. In this case, the reliability of the controllable demand is used. Accordingly, controllable amount can be correctly estimated.

Concretely, the amount obtained by multiplying the coefficient (weight) set for each reliability and the determine control amount is estimated as the actually adjusted (reduced or increased) control amount. The coefficient (weight) is $\lambda 1$ for the reliability I, $\lambda 2$ for the reliability II, . . . , $\lambda n$ for the reliability N. The coefficients $\lambda 1, \lambda 2, \ldots, \lambda n$ may be the same as or different from $\alpha 1, \alpha 2, \ldots, \alpha n$ in Formula (2).

For example, suppose a case where a certain controllable appliance has the reliability I. Further, based on the controllable demand information of the controllable appliance, 10 is obtained as electric energy which can be reduced by turning off the power source of the appliance. In this case, the amount value obtained by multiplying 10 and the coefficient is estimated as the reducible amount.

The adjusted short-term demand margin level is calculated by adding the magnitude of the reducible amount multiplied by the coefficient as stated above to the right-hand side of Formula (2) for calculating the short-term demand margin level. When the adjustment is performed to increase the demand, the adjusted short-term demand margin level can be calculated by subtracting the increase amount multiplied by the coefficient from the right-hand side. The long-term demand margin level is similarly calculated.

Figure 21:
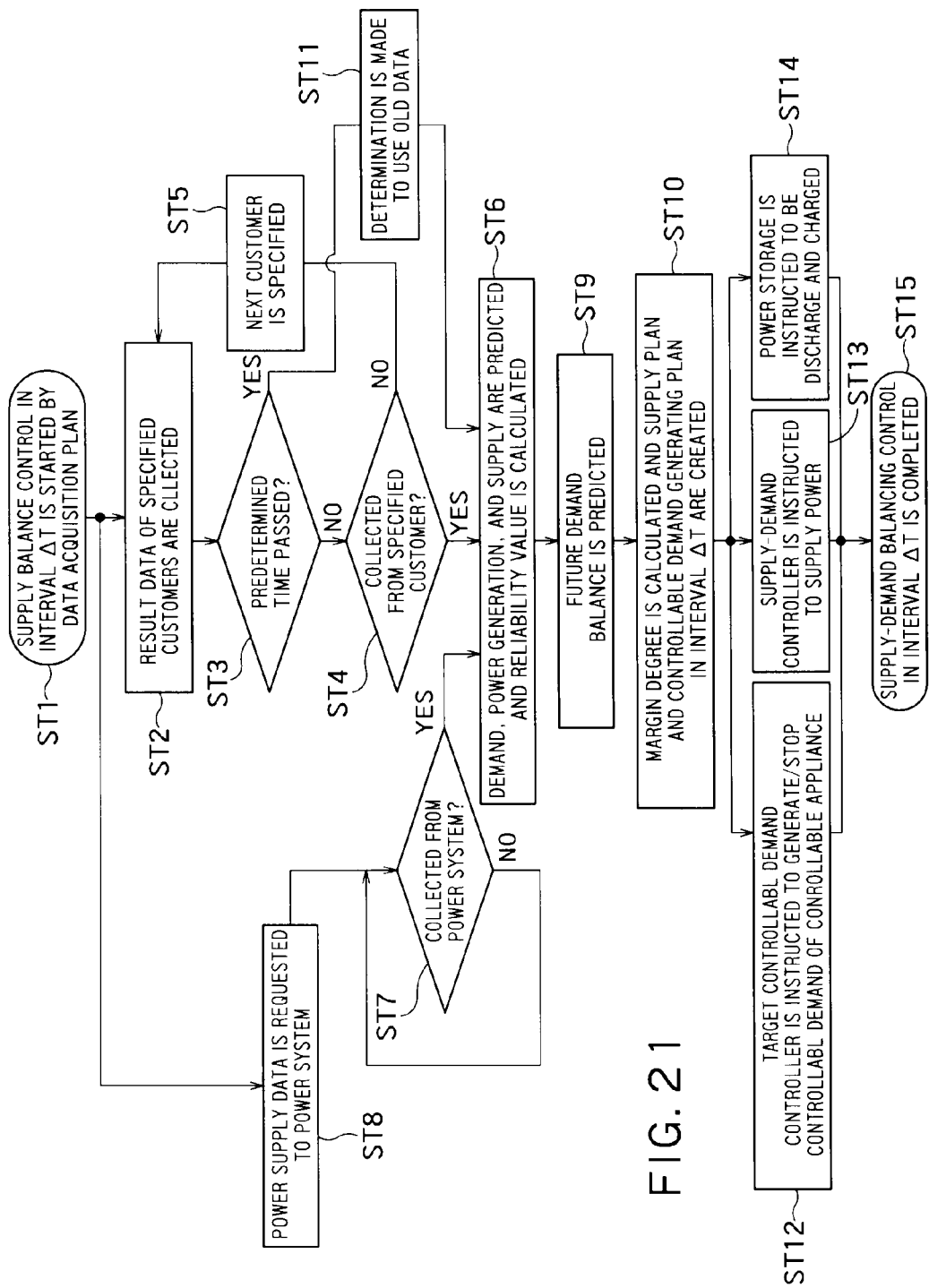
FIG. 21 shows a flow of the operation performed by the supply-demand balance controller of FIG. 1.

FIG. 21 is a flow chart showing the flow of operation performed by the supply-demand balance controller shown in FIG. 1.

First, based on the data acquisition plan of the plan creator 45, a process for controlling the supply-demand balance in the interval k+1 is started (ST1).

The collection controller 3 sequentially collects, from each customer, the result data (demand data and power generation data) in the interval k−1 (ST2 to ST5). The length of each interval is $\Delta T$. Further, the controllable demand information of the controllable appliance is collected. The controllable demand information may be collected each time or at a predetermined number of time intervals. The collection controller 3 performs the collection depending on the request from the electric supply plan creator 1. In this case, the collection controller 3 performs the collection for customer at Ts sampling intervals depending on the request from the electric supply plan creator 1 at Ts time intervals. In this example, Ts=$\Delta T$ for simplification.

Figure 22:
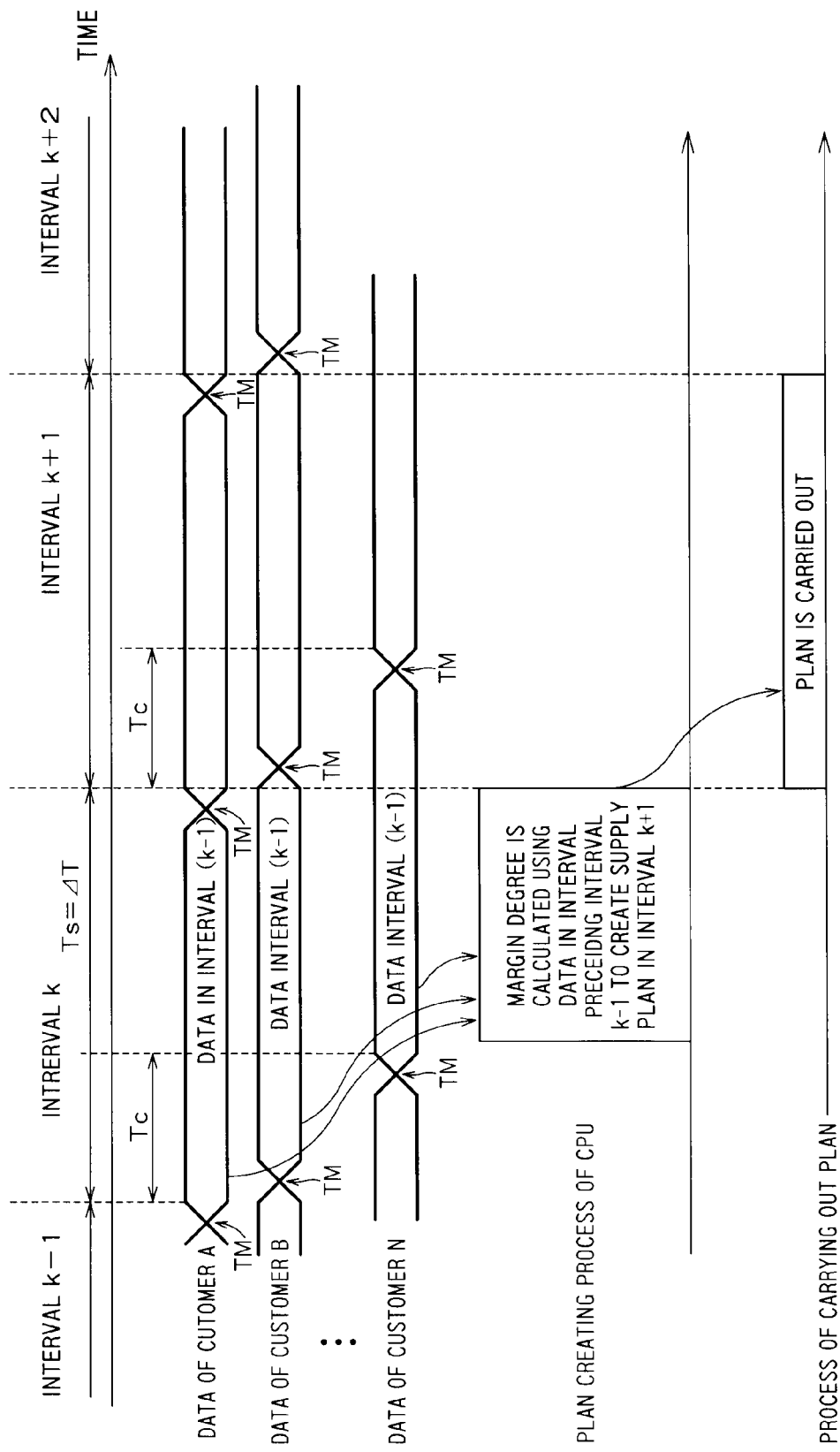
FIG. 22 shows how to collect the data of each customer at sampling intervals.

FIG. 22 shows how the sampling is performed. In this example, data is sequentially collected from each customer. The reference symbol TM shows the timing for acquiring the data.

In FIG. 21, the result data of a customer 1 in the interval k−1 (electric energy consumed by the customer in the interval k−1) is acquired before the end of the interval k−1, but this is not so much a problem. For example, when the format of the demand data relates to power (power consumption amount per unit time), the average power value at the point of collecting the data in the corresponding interval is used. Further, the format of the demand data to be collected relates to electric energy, the average power value at the point of collecting the data in the interval is multiplied by the length ($\Delta T$) of the interval. Note that the data of each customer may be collected starting from the present interval (interval k).

In the example of FIG. 22, data of each customer is sequentially collected, but the data of each customer may be simultaneously collected, if possible.

The data is collected within a predetermined time Tc starting from the present interval k (ST3). It is desirable that the value of the predetermined time is $\Delta T/2$ or smaller, for example, considering the time required to create a plan after collecting the data.

The result data of each customer is sequentially collected since the start of the interval k until the predetermined time Tc passes (YES at ST3, ST4, ST5). The collected data is stored in the history storage 4. When the data of every customer is completely collected within the predetermined time Tc starting from the interval k (NO at ST3, YES at ST4), the flow proceeds to step ST6.

On the other hand, when the predetermined time passes before the data of every customer is completely collected (YES at ST3), determination is made for the customer whose data is not collected to use the result data collected in the interval further preceding by one interval (k−2 interval) (the demand data already stored in the history storage 4) (ST11). The flow proceeds to step ST6.

Power supply data is requested from the power system 100 separately from collecting the data from the customer (ST8). The power supply data is requested at Ts sampling intervals, for example. The collection is performed by the power supply input unit 9 depending on the request from the electric supply plan creator 1. When the power supply data is completely collected (YES at ST7), the flow proceeds to step ST6.

In step ST6, the demand & predicting calculator 5 calculates the predictive demand and its reliability value of each device (customer appliance, controllable appliance) in each of the intervals k+1, k+2, and k+3.

Further, the steady supply calculator 11 extracts, from the power supply data, the electric energy supply from the high-accuracy power generating unit stably supplying power in the intervals k+1, k+2, and k+3.

Further, the variable supply calculator 10 extracts, from the power supply data, the electric energy supply from the variable power generating unit unstably supplying power. The Supply predicting calculator 16 calculates the predictive supply and its reliability value in each of the intervals k+1, k+2, and k+3.

Further, the reliability-level-based demand aggregator 41 classifies the predictive demand of each appliance into a plurality of groups depending on its reliability value. The classified predictive demand is counted (summed) with respect to each reliability group. In this way, the total predictive demand of each reliability group in each of the intervals k+1, k+2, and k+3 is obtained. The total predictive demand calculated on each reliability group is transmitted to the corresponding supply-demand balancing unit among the supply-demand balancing units 51(I) to 51(N) having reliability I to N.

Further, the reliability-level-based supply/power generation aggregator 43 classifies the predictive power generation of each customer received from the demand & predicting calculator 5 into the groups having reliability I to N depending on its reliability value. Further, the predictive supply of each power generating unit (variable power generating unit) received from the Supply predicting calculator 16 is classified into the groups having reliability I to N depending on its reliability value. Further, the scheduled supply amount of each power generating unit (high-accuracy power generating unit) received from the steady supply calculator 11 is classified into the reliability I group. Then, predictive power generation and predictive supply are counted (summed) with respect to each reliability group. In this way, the total predictive supply/power generation in each of the intervals k+1, k+2, and k+3 is obtained with respect to each reliability group.

The reliability-level-based supply/power generation aggregator 43 transmits the total predictive supply/power generation calculated on the reliability I group to the reliability I supply-demand balancing unit 51(I). Similarly, the reliability-level-based supply/power generation aggregator 43 transmits the total predictive supply/power generation calculated on the reliability II to N groups to the supply-demand balancing units 51(II) to 51(N) having reliability II to N respectively.

Next, in step ST9, each of the supply-demand balancing units 51(I) to 51(N) estimates the state of the supply-demand balance. Concretely, the difference between the total predictive supply/power generation and the total predictive demand (supply-demand difference) is calculated with respect to each interval. For example, the supply-demand difference in the interval k+1, the supply-demand difference in the interval k+2, and the supply-demand difference in the interval k+3 are calculated. The supply-demand difference in each interval calculated by each of the supply-demand balancing unit 51(I) to 51(N) is transmitted to the supply-demand balance controller 44.

In the next step S10, the supply-demand balance controller 44 calculates the short-term demand margin level Ms and the long-term demand margin level Ml based on the above Formula (2) and Formula (3).

Further, the plan creator 45 determines, based on the values of the short-term demand margin level Ms and long-term demand margin level Ml, a policy of the supply-demand control for the controllable appliance of each customer, the power system 100, and the power storage 130. Then, a plan is created depending on the determined policy, and control is performed based on the created plan.

For example, the controllable demand controller 120 is instructed to control a target controllable appliance (ST12), and the supply-demand controller 110 is instructed to supply power to each customer (ST13), and the power storage 130 is instructed on discharge or charge (ST14). Further, a request of additional power is made to the power system 100 as needed.

To improve the understanding of the present embodiment, the operation in the present embodiment will be schematically explained from the viewpoint of the customer N referring to the appliances of the customer N shown in FIG. 3.

The customer N previously makes a contract so that the charging the storage battery of the electric car 23n(2) and setting the temperature of the air conditioner 23n(1) can be controlled.

The user operates a solar photovoltaic system having the solar power generation panel 24n while using the air conditioner 23n(1) and the customer appliance 22n. The supply-demand balance controller in the present embodiment periodically acquires the demand data and power generation data of the customer N.

When the weather is fine in the noon, the power generation of the solar power generation panel 24n is increased, but this power generation is easily influenced by clouds etc. and thus has less reliability.

When the predictive value of the power consumed by the air conditioner is increased with extremely high reliability in a plurality of customers, supply becomes deficient. The balance difference of the high-accuracy supply-demand balancing unit (reliability I supply-demand balancing unit) becomes a large minus, and the long-term demand margin level Ml enter a minus state.

The supply-demand balance controller in the present embodiment controls the contracted controllable demand, and requests additional power from the power system. In this example, charging the storage battery of the electric car 23n (2) and setting the temperature of the air conditioner 23n(1) are contracted as controllable demand. Thus, when the storage battery is charged, the charge is stopped. Further, when the storage battery is not charged, the set temperature of the air conditioner 23n(1) is increased to restrain electricity consumption.

In the night, the demand data has a restrained value with high reliability in a plurality of customers. Accordingly, the balance difference of the high-accuracy supply-demand balancing unit (reliability I supply-demand balancing unit) becomes a large plus. The long-term demand margin level Ml has a large plus value, and a controllable demand can be generated.

In this example, the supply-demand balance controller monitors the state of the storage battery of the electric car 23n(2), and gives instructs to generate the controllable demand in order to charge the storage battery if the charge is possible.

In the present embodiment, the predictive demand and the reliability value are calculated with respect to each customer appliance, but the predictive demand and the reliability value may be calculated with respect to each customer. In this case, naturally, the first weighted sum is calculated by obtaining a weighted sum of the predictive demand of the customers and weights depending on their reliability values (or reliability) in the process of calculating the short-term supply-demand margin level and the long-term supply-demand margin level.

Further, in the present embodiment, the predictive power generation and the reliability value are calculated with respect to each power generator, but the predictive power generation and the reliability value may be calculated with respect to each customer. In this case, naturally, the third weighted sum is calculated by obtaining a weighted sum of the predictive power generations of the customers and weights depending on their reliability values (or reliability in the process of calculating the short-term supply-demand margin level and the long-term supply-demand margin level.

Second Embodiment

A second embodiment is characterized in that the interval for collecting data is changed depending on reliability.

The first embodiment shows a case where the sampling interval Ts is the same as the time interval $\Delta T$.

In the second embodiment, in the collection controller 3 for collecting data from the customers, the sampling interval for collecting data is changed with respect to each appliance.

Concretely, in the plan created for the interval preceding by one interval, the reliability groups classified with respect to each device are stored. In the plan created for the present interval, a longer sampling interval is set for the appliance previously classified into a group having higher reliability, and a shorter sampling interval is set for the appliance previously classified into a group having lower reliability.

Figure 23:
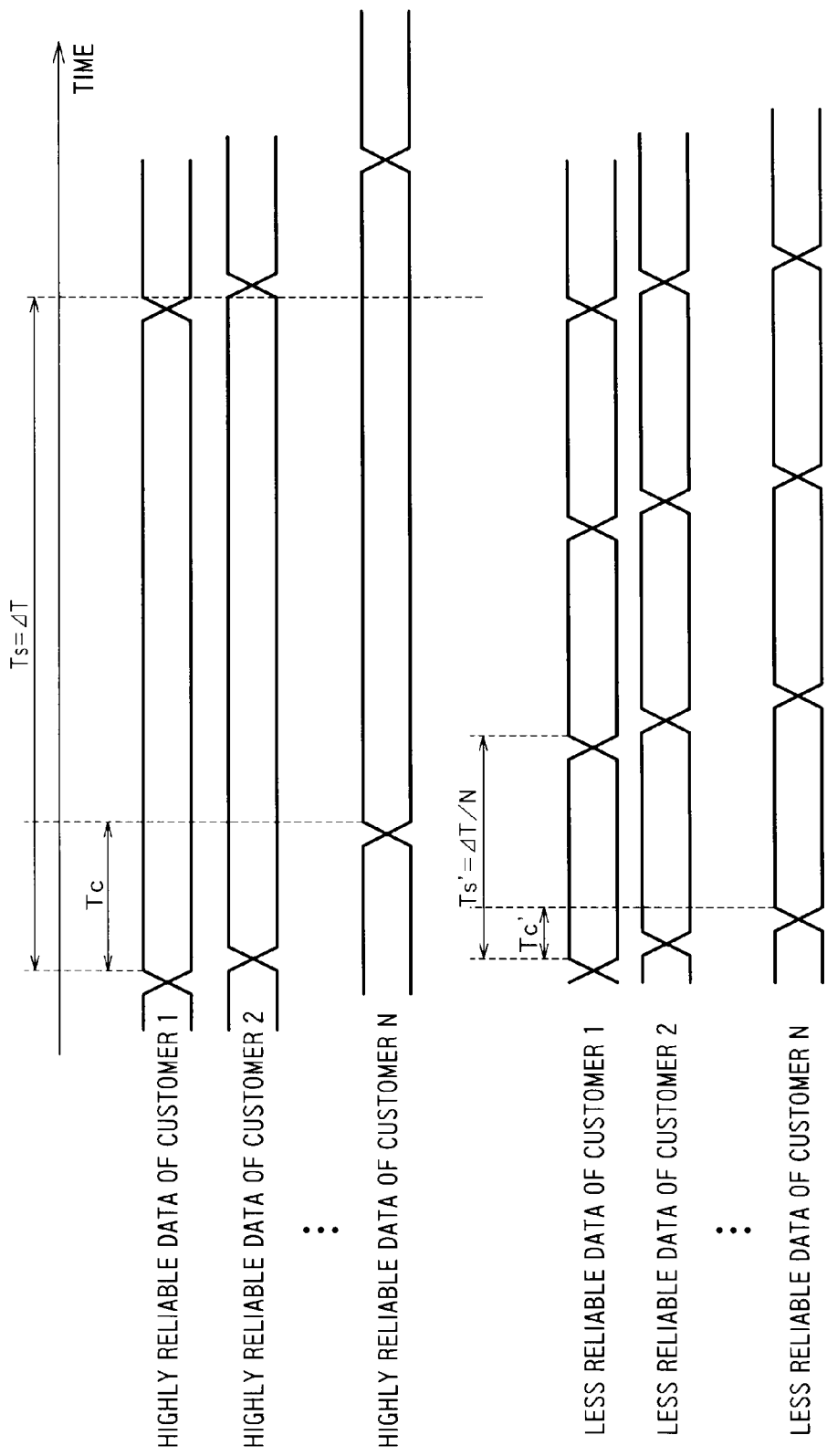
FIG. 23 shows an example where the sampling interval is changed depending on reliability according to a second embodiment.

For example, as shown in the top of FIG. 23, the sampling interval Ts is $\Delta T$ when the appliance has high reliability (e.g. the appliance of the reliability I group), similarly to the first embodiment. Further, the sampling interval Ts' is $\frac{1}{2}$ or $\frac{1}{3}$ of ΔT when the appliance has low reliability (e.g. the appliance of reliability II or III group). FIG. 23 shows at the bottom thereof an example where the sampling interval is Δ⅓. The sampling interval Ts of the reliability N is calculated as ΔT/N. By reducing the sampling interval, each predetermined time for sampling collecting (see the flow chart of FIG. 21) is correspondingly reduced as Tc'(<Tc).

Note that the sampling may be performed always at constant sampling intervals as shown in the drawing, or may be started from the present interval k as in the first embodiment. When the sampling is performed from the start of the present interval, the appliance having high reliability is sample once after the start of the interval, for example, and the appliance having low reliability is sampled a plurality of times after the start of the interval.

Figure 24:
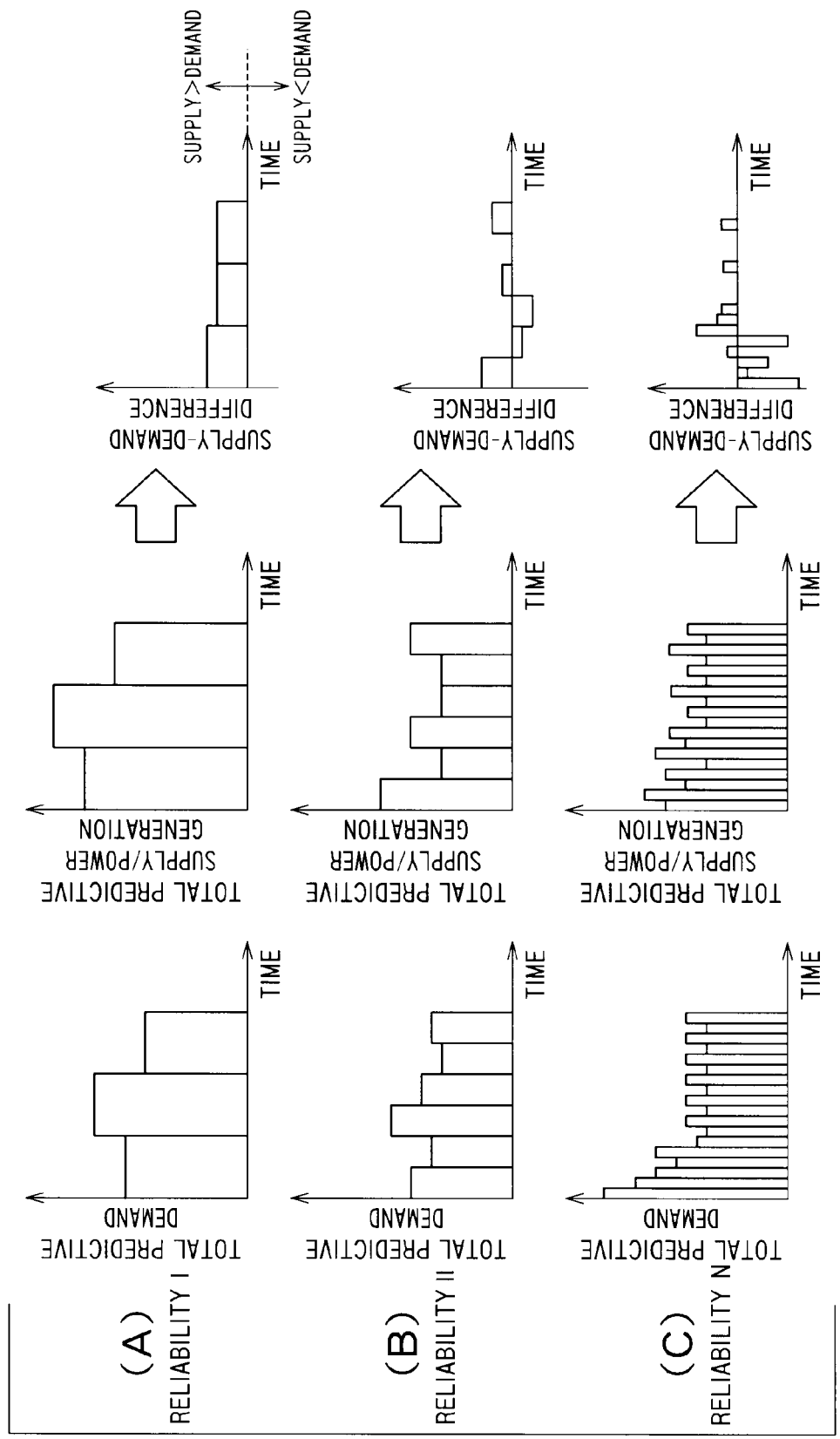
FIG. 24 shows the operation of a supply-demand balancing unit in the second embodiment.

By collecting data while changing the sampling interval depending on reliability in this way, the balance differences (supply-demand differences) calculated by the supply-demand balancing units 51(I), 51(II) . . . 51(N) are as shown in FIG. 24.

In a group having low reliability, for example reliability N group, the total predictive demand and the total predictive supply/power generation are compared three times within one interval, and the supply-demand difference is obtained three times within one interval (N=3 in this example). When calculating the short-term supply-demand margin level and the long-term supply-demand margin level, the sum of the three supply-demand differences is regarded as the supply-demand difference calculated in the one interval. In this way, it can be expected that the reliability of the group having low reliability is substantially increased.

Third Embodiment

In the present embodiment, the reliability-level-based demand aggregator 41 corrects the predictive demand calculated by the demand & predicting calculator in order to calculate the total predictive demand using the corrected predictive demand, and further to calculate the supply-demand difference.

The correction is performed by adding a correction constant to the predictive demand. The correction constant is obtained on each reliability group, and the predictive demand included in the same reliability group are added with the same correction constant.

The correction constant for a reliability s group is calculated as follows. Note that the following explanation will be made focusing on one interval (interval k+1). Similar operation is performed in each of the other intervals (interval k+2, interval k+3).

The standard deviation of the predictive demand classified into the reliability s group is obtained (i.e. the standard deviation of the predictive demand is obtained with respect to each of a plurality of ranges obtained by dividing a possible value of the reliability value Rs). Then, by multiplying the standard deviation by the constant determined depending on the reliability s (i.e. constant determined depending on the range), the correction constant is obtained. The ranges may be 100<Rs, 10<Rs≤100, or Rs≤10, for example, as in the first embodiment.

For example, in the case of a group having high reliability (reliability I), the value of the correction constant is obtained by multiplying the standard deviation of the predictive demand calculated for the high reliability group (in the range of 100<Rs) by +1 (or a positive value approximate thereto).

In the case of a medium reliability (reliability II) group, the value of the correction constant is obtained by multiplying the standard deviation of the predictive demand calculated for the medium reliability group (in the range of 10<Rs≤100) by 0 (or 0 a value approximate thereto).

In the case of a low reliability (reliability III) group, the value of the correction constant is obtained by multiplying the standard deviation value of the predictive demand calculated for the low reliability group (in the range of Rs≤10) by −1 (or a negative value approximate thereto).

As will be understood from this example, the value of "the constant determined depending on reliability" is increased as the reliability becomes higher (as the reliability value becomes smaller), and is reduced as the reliability becomes lower (as the reliability value becomes larger).

The reliability-level-based demand aggregator 41 calculates the corrected predictive demand by adding the correction constant obtained for each reliability group to the predictive demand, and sums the corrected predictive demand of each reliability group to obtain the total predictive demand of each reliability group. Note that the total predictive supply/power generation is calculated similarly to the first embodiment.

The reliability-level-based demand aggregator 41 obtains the difference between the total predictive demand of each reliability group and the total predictive supply/power generation of each reliability group to calculate the supply-demand difference of each reliability group. In the present embodiment, the supply-demand difference calculated in this way is particularly referred to as deemed supply-demand difference. The deemed supply-demand difference obtained for the reliability s is described as Difs'.

Therefore, in the present embodiment, the short-term supply-demand margin level and the long-term supply-demand margin level are calculated as follows by using the deemed supply-demand differences Dif1', Dif2', . . . Difn' of the reliability I, II, . . . N.

Short-term supply-demand margin level: $Ms = \alpha 1 \times \text{Dif1}'(k+1) + \alpha 2 \times \text{Dif2}'(k+1) + \ldots + \alpha n \times \text{Dif}n'(k+1)$    Formula (2')

Long-term supply-demand margin level: $Ml = \alpha 1 \times \text{Dif1}'(k+1) + \alpha 2 \times \text{Dif2}'(k+1) + \ldots + \alpha n \times \text{Dif}n'(k+1) + \beta 1 \times \text{Dif1}'(k+2) + \beta 2 \times \text{Dif2}'(k+2) + \ldots + \beta n \times \text{Dif}n'(k+2) + \gamma 1 \times \text{Dif1}'(k+3) + \gamma 2 \times \text{Dif2}'(k+3) + \ldots + \gamma n \times \text{Dif}n'(k+3)$    Formula (3')

Figure 25:
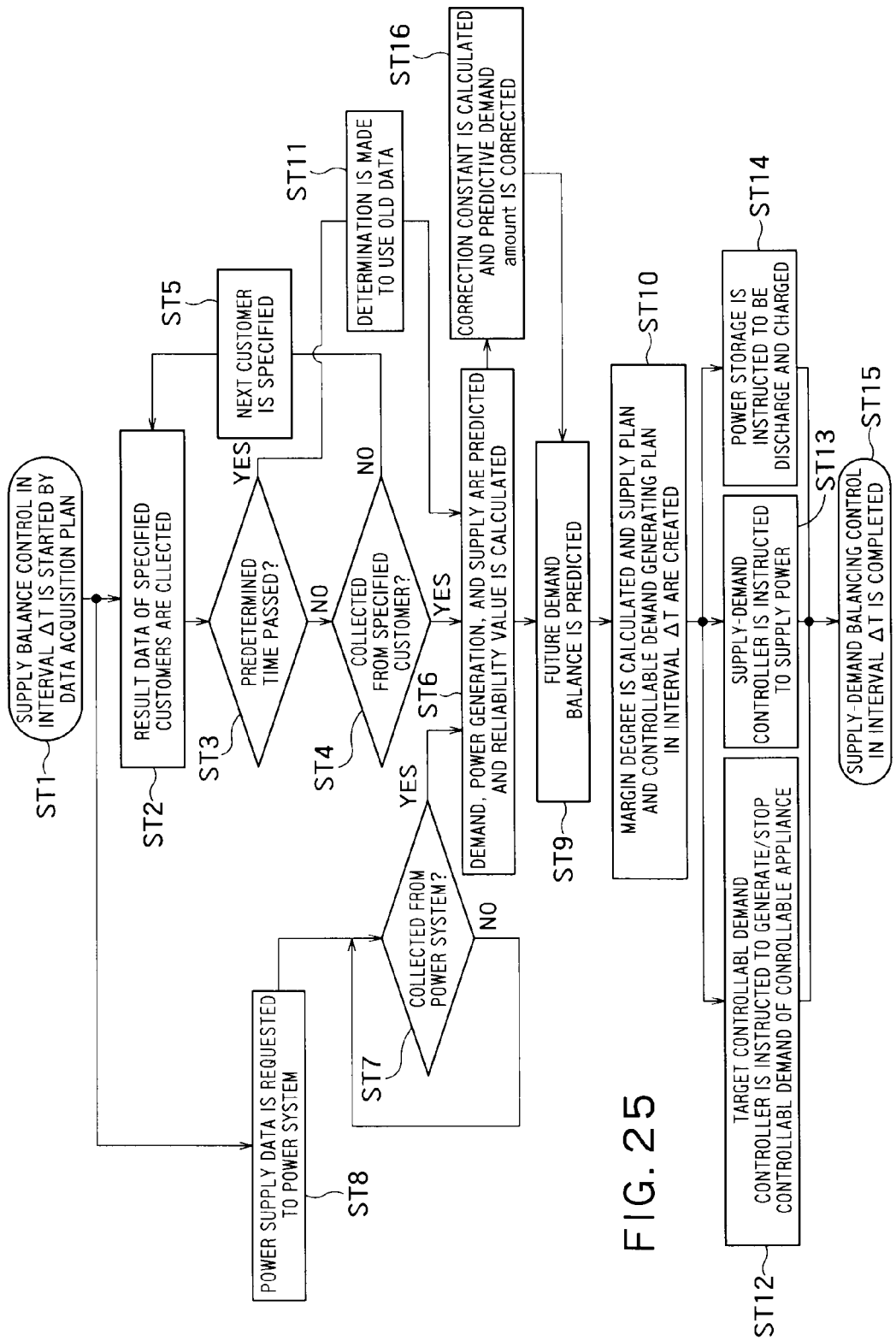
FIG. 25 shows a flow of the overall operation performed by a supply-demand balance controller according to a third embodiment.

FIG. 25 shows the flow of the overall operation performed by the supply-demand balance controller according to the present embodiment. Step ST15 is added after the step ST6 of FIG. 21. In step ST15, a correction constant is obtained to correct the predictive demand by the correction constant. The steps other than step ST15 are similar to those of FIG. 21, and thus the same symbols as those of FIG. 21 are assigned thereto and overlapping explanation will be omitted.

Figure 26:
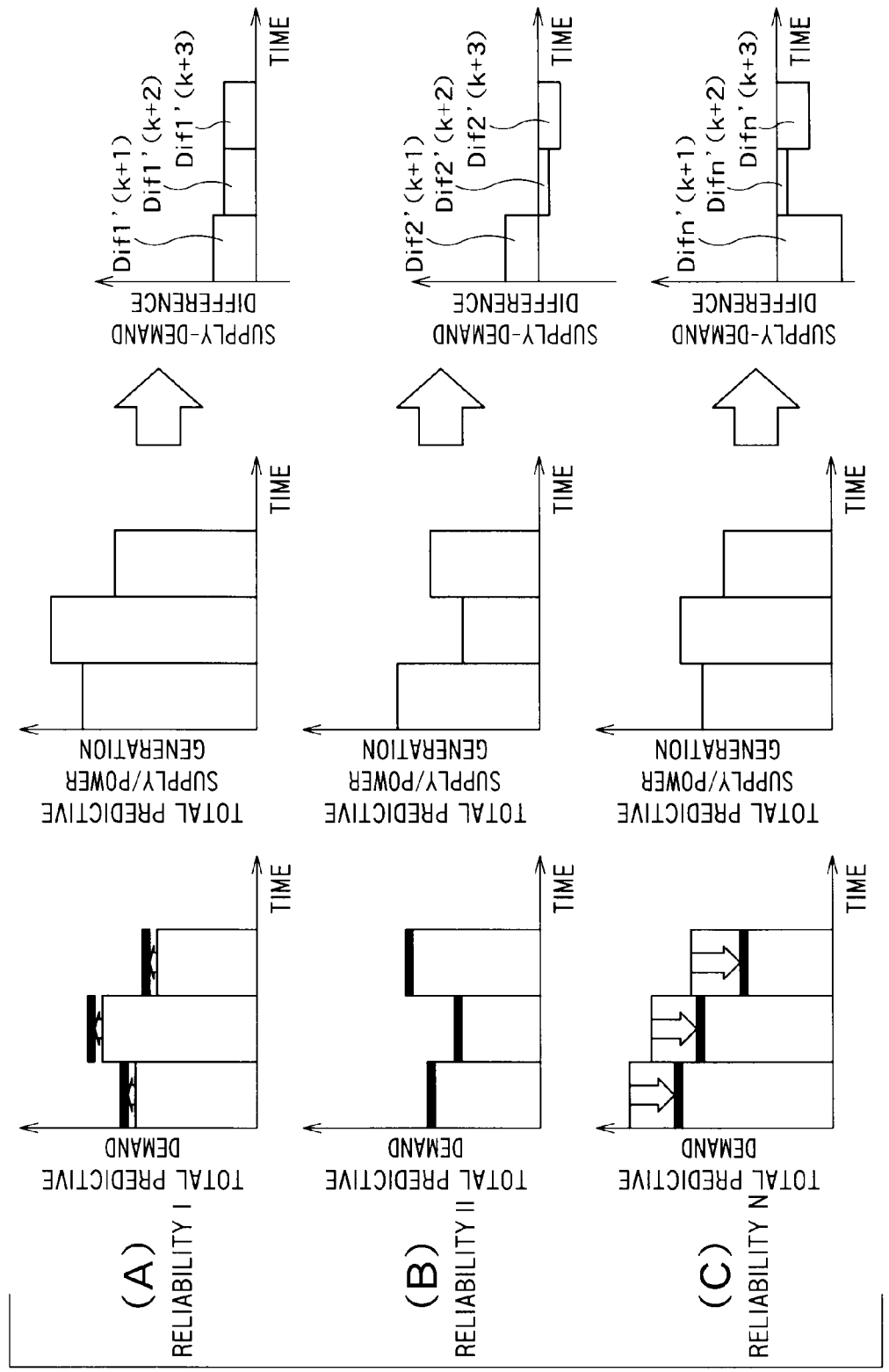
FIG. 26 shows an example of how to calculate a supply-demand difference according to a third embodiment.

FIG. 26 shows an example of how to calculate a supply-demand difference according to a third embodiment.

The corrected predictive demand of a high reliability (reliability I) group is set larger than the original predictive demand by the standard deviation magnitude of this group (correction constant=standard deviation×1 in this case). Accordingly, as shown in FIG. 26(A), the total predictive demand of the reliability I group is set larger compared to the case where correction is not performed.

Further, the corrected predictive demand of medium reliability (reliability II) group has the same magnitude as the original predictive demand (correction constant=standard deviation×0=0 in this case). Accordingly, as shown in FIG. 26(B), the total predictive demand of the reliability II group has the same value compared to the case where correction is not performed.

Further, the corrected predictive demand of low reliability (reliability III) group is set smaller than the original predictive demand by the standard deviation magnitude of this group (correction constant=standard deviation×(−1) in this case). Accordingly, as shown in FIG. 26(C), the total predictive demand of the reliability III group is set smaller compared to the case where correction is not performed.

In the third embodiment, it is possible to reduce the frequency of excessively requesting power generation from the power system even when the result value of the high reliability demand capacity is larger than the predictive value, compared to the fundamental supply-demand balancing technique in the first embodiment. As a result, it is possible to realize supply-demand balancing control more focusing on the supply-demand balance having high reliability than the first embodiment, and to hedge the upper deflection of the predictive value of the customer with higher reliability.

Note that the supply-demand balance controller explained in FIG. 1 can be realized by using a general computer device as basic hardware, for example. That is, each element included in the device of FIG. 1 and each element included in the electric supply plan creator of FIG. 2 may be realized by letting a computer carry out a program describing instructions of each process. In this case, the supply-demand balance controller can be realized by previously installing the above program in the computer device or by properly installing, in the computer device, the above program stored in a storage medium such as hard disk, memory device, optical disk, etc. or distributed through the network. Further, the history storages 4 and 17 can be realized by properly using a storage medium such as internal/external memory or hard disk of the above computer device, CD-R, CD-RW, DVD-RAM, DVD-R, etc.

The present invention is not limited to the exact embodiments described above and can be embodied with its components modified in an implementation phase without departing from the scope of the invention. Also, arbitrary combinations of the components disclosed in the above-described embodiments can form various inventions. For example, some of the all components shown in the embodiments may be omitted. Furthermore, components from different embodiments may be combined as appropriate.

The invention claimed is:

1. A supply-demand balance controller for creating a power supply plan in a predetermined period, comprising:
   a collection controller configured to collect, from customers, power demand data showing power consumed by customer appliances, the customer appliances including a controllable appliance whose power consumption can be controlled from an external point;
   a first storage configured to store a history of power demand of the customers;
   a first predicting unit configured to predict power demand of the customers in the predetermined period, based on the history in the first storage;
   a second storage configured to store predictive power demand of the customers predicted by the first predicting unit;
   a first reliability value calculator configured to calculate first reliability values that are reliability values of the predictive power demand of the customers such that the first reliability value of each customer becomes larger as dispersion or standard deviation of differences between the power demand of the customers in the first storage and the predictive power demand of the customers in the second storage becomes smaller;
   a power receiving unit configured to receive power from a power system, the power system generating power with a plurality of power generating units;
   a distribution unit configured to distribute the power received at the power receiving unit to the customers;
   a power supply acquiring unit configured to acquire data concerning power supplied by each power generating unit of power received from the power system;
   a third storage configured to store a history of power supplied by each power generating unit;
   a second predicting unit configured to predict power supplied by each power generating unit in the predetermined period, based on the history stored in the third storage;
   a fourth storage configured to store data of predictive supplied power of each of the power generating units;
   a second reliability value calculator configured to calculate second reliability values that are reliability values of the predictive supplied power of the power generating units such that the second reliability value of each power generating unit becomes larger as dispersion or standard deviation of differences between the supplied power of the each power generating unit in the third storage and the predictive supplied power of the each power generating unit in the fourth storage becomes smaller;
   a reliability-level-based demand aggregator configured to classify the customers into a plurality of groups based on the first reliability values;
   a reliability-level-based supply/power generation aggregator configured to classify the power generating units into the groups based on the second reliability values;
   a balancing unit configured to calculate, for each of the groups, a difference between a first sum of the predictive power demand of the customers belonging to the group and a second sum of the predictive supplied power of the power generating units belonging to the group, and to calculate a sum of calculated differences multiplied by weights assigned to the groups to obtain a supply-demand margin level; and
   a plan creator configured to create a plan in the predetermined period for controlling power used by the controllable appliances of each customer based on the supply-demand margin level.

2. The supply-demand balance controller of claim 1, wherein the plan creator creates the plan so that the supply-demand margin level in the predetermined period falls within a predetermined range.

3. The supply-demand balance controller of claim 2, further comprising:
   an addition requesting unit configured to request additional power supply to the power system,
   wherein the plan creator further creates the plan for controlling a request for additional power supply to the power system in the predetermined period based on the supply-demand margin level.

4. The supply-demand balance controller of claim 2,
   wherein the power receiving unit can charge a power storage device with power received from the power system,
   the distribution unit can distribute, to the customers, the power stored in the power storage device, and
   the plan creator further creates the plan for controlling charge and discharge of the power storage device in the predetermined period based on the supply-demand margin level.

5. The supply-demand balance controller of claim 1,
wherein the collection controller collects data of the power demand that represent power consumed by each of the customer appliances,
the first storage stores a history of the power demand of the customer appliances,
the first predicting unit predicts power demand consumed by each of the customer appliances based on the history of the power demand of the customer appliances,
the first reliability value calculator calculates reliability values of the predictive power demand of the customer appliances as the first reliability values,
the reliability-level-based demand aggregator classifies the customer appliances into the groups based on the reliability values;
the balancing unit calculates the first sum of each of the groups as a sum of the predictive power demand of the customer appliances belonging to each of the groups.

6. The supply-demand balance controller of claim 1,
wherein the collection controller collects data of power generation by power generators in the customers, at least one of the customers holding at least one power generator,
the first storage stores a history of the power generation of each customer,
the first predicting unit predicts power generated by the power generator in each customer, based on the history of the power generation in the first storage,
the second storage stores data on predictive generation power of the customers,
the first reliability value calculator calculates reliability values of the predictive generation power of the customers, based on a difference between generation power in the first storage and predictive generation power in the second storage,
the reliability-level-based supply/power generation aggregator classifies the customers into the groups based on the reliability values of the predictive generation power of the customers;
the balancing unit calculates, for each of the groups, a difference between the first sum and a total of the second sum and a third sum of the predictive generation power of the customers classified to the group and calculates a sum of calculated differences multiplied by weights assigned to the groups to obtain a supply-demand margin level.

7. The supply-demand balance controller of claim 1,
wherein the first storage stores a history of the power generation of each power generator,
the first predicting unit calculates predictive generation power of each power generator based on the history of the power generation,
the first reliability value calculator calculates reliability values of the predictive generation power of the power generators, and
the reliability-level-based supply/power generation aggregator classifies the power generators into the groups based on the reliability values of the predictive power of the power generators;
the balancing unit calculates the third sum of each of the groups as a sum of the predictive generation power of the power generators classified to the group.

8. The supply-demand balance controller of claim 1,
wherein the balancing unit calculates a supply-demand margin level of a long period including both the predetermined period and one or more period following the predetermined period, and
the plan creator creates the plan in the predetermined period based on the supply-demand margin level of the predetermined period and the supply-demand margin level of the long period.

9. The supply-demand balance controller of claim 1,
wherein the collection controller shortens a sampling interval of the power demand data acquired from the consumer's appliances as the first reliability value of the customer become lower, and lengthens the sampling interval of the power demand data acquired from the consumer's appliances as the first reliability value of the customer become higher.

10. The supply-demand balance controller of claim 1,
wherein a possible range of the first reliability values is sectioned into a plurality of intervals,
the groups to which the customers belongs is determined depending on whether the first reliability values of the customers each are included in which interval, and
a higher weight is assigned to the group of the interval of higher first reliability values.

11. The supply-demand balance controller of claim 10,
wherein the balancing unit is further configured to:
calculate a standard deviation of the predictive power demand in each of the intervals by using the predictive power demand falling within each of the intervals,
correct the predictive power demand of each customer by adding a multiplied value between the standard deviation of the interval including the first reliability value of the customer and a coefficient assigned to the interval wherein a higher coefficient is assigned to the interval including higher first reliability values, and
calculate the first sum by using the corrected predictive power demand.

* * * * *